United States Patent
Reed et al.

(10) Patent No.: US 11,044,118 B1
(45) Date of Patent: Jun. 22, 2021

(54) DATA CACHING IN PROVIDER NETWORK SUBSTRATE EXTENSIONS

(71) Applicant: Amazon Technologies, Inc., Seattle, WA (US)

(72) Inventors: Paul C. Reed, Newton, MA (US); Asawaree Kalavade, Acton, MA (US); Danny Wei, Seattle, WA (US); Marc Stephen Olson, Bellevue, WA (US); Brad E. Marshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 16/457,831

(22) Filed: Jun. 28, 2019

(51) Int. Cl.
*H04L 12/46* (2006.01)
*H04L 12/66* (2006.01)
*H04L 29/08* (2006.01)

(52) U.S. Cl.
CPC .......... *H04L 12/4633* (2013.01); *H04L 12/66* (2013.01); *H04L 67/20* (2013.01)

(58) Field of Classification Search
CPC ...... H04L 12/4633; H04L 12/66; H04L 67/20
USPC ........................................................ 709/218
See application file for complete search history.

(56) References Cited

U.S. PATENT DOCUMENTS

| 8,601,134 | B1* | 12/2013 | Sorenson, III | H04L 67/2842 709/227 |
| 8,789,208 | B1* | 7/2014 | Sundaram | G06F 3/065 726/29 |
| 8,793,343 | B1* | 7/2014 | Sorenson, III | G06F 16/183 709/219 |
| 8,832,039 | B1* | 9/2014 | Sorenson, III | G06F 11/1448 707/679 |
| 9,635,132 | B1* | 4/2017 | Lin | G06F 3/0652 |
| 9,690,504 | B1 | 6/2017 | Natanzon et al. | |
| 9,692,729 | B1 | 6/2017 | Chen et al. | |
| 9,733,849 | B2 | 8/2017 | O'Hare et al. | |

(Continued)

FOREIGN PATENT DOCUMENTS

WO 2015/179508 A1 11/2015

OTHER PUBLICATIONS

Non-Final Office Action, U.S. Appl. No. 16/457,827, dated Jul. 28, 2020, 10 pages.

(Continued)

*Primary Examiner* — Tauqir Hussain
(74) *Attorney, Agent, or Firm* — Nicholson De Vos Webster & Elliott LLP

(57) ABSTRACT

One or more configuration parameters for an object gateway instance are received at an interface to a provider network, the parameters including an identifier of a first object store of the provider network for which to cache objects in a first object cache of the object gateway instance and an indication of a data transfer mode that controls when objects written to the first object cache are written to the first object store. The one or more configuration parameters are stored in a data store of the provider network and sent to the object gateway instance. A read request that includes the identifier of the first object store and a first object identifier is received from the object gateway instance, and a first object associated with the first object identifier and stored in the first object store is sent to the object gateway instance.

17 Claims, 16 Drawing Sheets

(56) References Cited

U.S. PATENT DOCUMENTS

| | | |
|---|---|---|
| 9,813,379 B1 | 11/2017 | Shevade et al. |
| 9,942,787 B1 | 4/2018 | Tillotson |
| 9,954,763 B1 | 4/2018 | Ye et al. |
| 10,185,507 B1 | 1/2019 | Olson et al. |
| 10,268,593 B1 | 4/2019 | Olson et al. |
| 10,298,670 B2 | 5/2019 | Ben-Shaul et al. |
| 10,333,789 B1 | 6/2019 | Dippenaar et al. |
| 2006/0253555 A1 | 11/2006 | Leung |
| 2008/0281908 A1* | 11/2008 | McCanne ............ G06F 16/172 709/203 |
| 2008/0313474 A1 | 12/2008 | Kahn et al. |
| 2009/0077097 A1* | 3/2009 | Lacapra ................ G06F 16/119 |
| 2013/0007219 A1 | 1/2013 | Sorenson et al. |
| 2013/0007854 A1* | 1/2013 | Sorenson, III ........ H04L 63/061 726/5 |
| 2014/0108665 A1 | 4/2014 | Arora et al. |
| 2014/0237594 A1 | 8/2014 | Thakadu et al. |
| 2014/0365549 A1 | 12/2014 | Jenkins |
| 2014/0372381 A1* | 12/2014 | Sorenson, III ...... H04L 67/1097 707/649 |
| 2015/0089034 A1 | 3/2015 | Stickle et al. |
| 2015/0134795 A1* | 5/2015 | Theimer .............. G06F 16/254 709/223 |
| 2015/0134796 A1* | 5/2015 | Theimer .............. G06F 16/258 709/223 |
| 2015/0261443 A1 | 9/2015 | Wei et al. |
| 2016/0048408 A1 | 2/2016 | Madhu et al. |
| 2017/0054680 A1 | 2/2017 | Ito |
| 2017/0180211 A1 | 6/2017 | Johnson |
| 2018/0173561 A1 | 6/2018 | Moroski et al. |
| 2018/0232308 A1* | 8/2018 | Kusters .................. G06F 3/065 |
| 2019/0278700 A1 | 9/2019 | Ranjan et al. |
| 2019/0286373 A1 | 9/2019 | Karumbunathan et al. |
| 2019/0361626 A1 | 11/2019 | East |
| 2020/0081648 A1 | 3/2020 | Bernat et al. |
| 2020/0167093 A1 | 5/2020 | Lan et al. |
| 2020/0183720 A1 | 6/2020 | Dai et al. |
| 2020/0320046 A1* | 10/2020 | Narayanamurthy .. G06F 3/0608 |

OTHER PUBLICATIONS

Non-Final Office Action, U.S. Appl. No. 16/457,841, dated Jul. 28, 2020, 11 pages.
U.S. Appl. No. 16/457,824, Pending.
U.S. Appl. No. 16/457,841, Pending.
U.S. Appl. No. 16/457,838, Pending.
U.S. Appl. No. 16/457,856, Pending.
U.S. Appl. No. 16/457,853, Pending.
U.S. Appl. No. 16/457,827, Pending.
U.S. Appl. No. 16/457,850, Pending.
U.S. Appl. No. 15/385,814, filed Dec. 20, 2016.
U.S. Appl. No. 15/385,767, filed Dec. 20, 2016.
U.S. Appl. No. 15/385,815, filed Dec. 20, 2016.
U.S. Appl. No. 16/196,723, filed Nov. 20, 2018.
U.S. Appl. No. 16/196,736, filed Nov. 20, 2018.
Final Office Action, U.S. Appl. No. 16/457,841, dated Jan. 26, 2021, 10 pages.
Final Rejection dated Jan. 26, 2021 for U.S. Appl. No. 16/457,827.
International Search Report and Written Opinion, PCT App. No. PCT/US2020/037195, dated Nov. 9, 2020, 13 pages.
Microsoft "Microsoft Cloud Networking for Enterprise Architects", Microsoft Corporation, Dec. 2016, 12 pages.
Non-Final Rejection dated Jan. 25, 2021 for U.S. Appl. No. 16/457,824.
Notice of Allowance, U.S. Appl. No. 16/457,853, dated Oct. 28, 2020, 24 pages.
International Search Report and Written Opinion for International Application No. PCT/US2020/039859, dated Oct. 14, 2020, 14 pages.

* cited by examiner

DATA CACHING IN PROVIDER NETWORK SUBSTRATE EXTENSIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

A wide variety of virtual machine types, optimized for different types of applications such as compute-intensive applications, memory-intensive applications, and the like may be set up at the data centers of some cloud computing provider networks in response to client requests. In addition, higher-level services that rely upon the virtual computing services of such provider networks, such as some database services whose database instances are instantiated using virtual machines of the virtual computing services, may also be made available to provider network clients. For some types of applications, however, such as applications that process very large amounts of data that has to be stored at customer premises outside the provider network, services that are limited to providing virtualized resources using hardware located at data centers of the provider network may not be optimal, e.g., for latency-related and/or other reasons.

BRIEF DESCRIPTION OF DRAWINGS

Various embodiments in accordance with the present disclosure will be described with reference to the following drawings.

DETAILED DESCRIPTION

Figure 1:
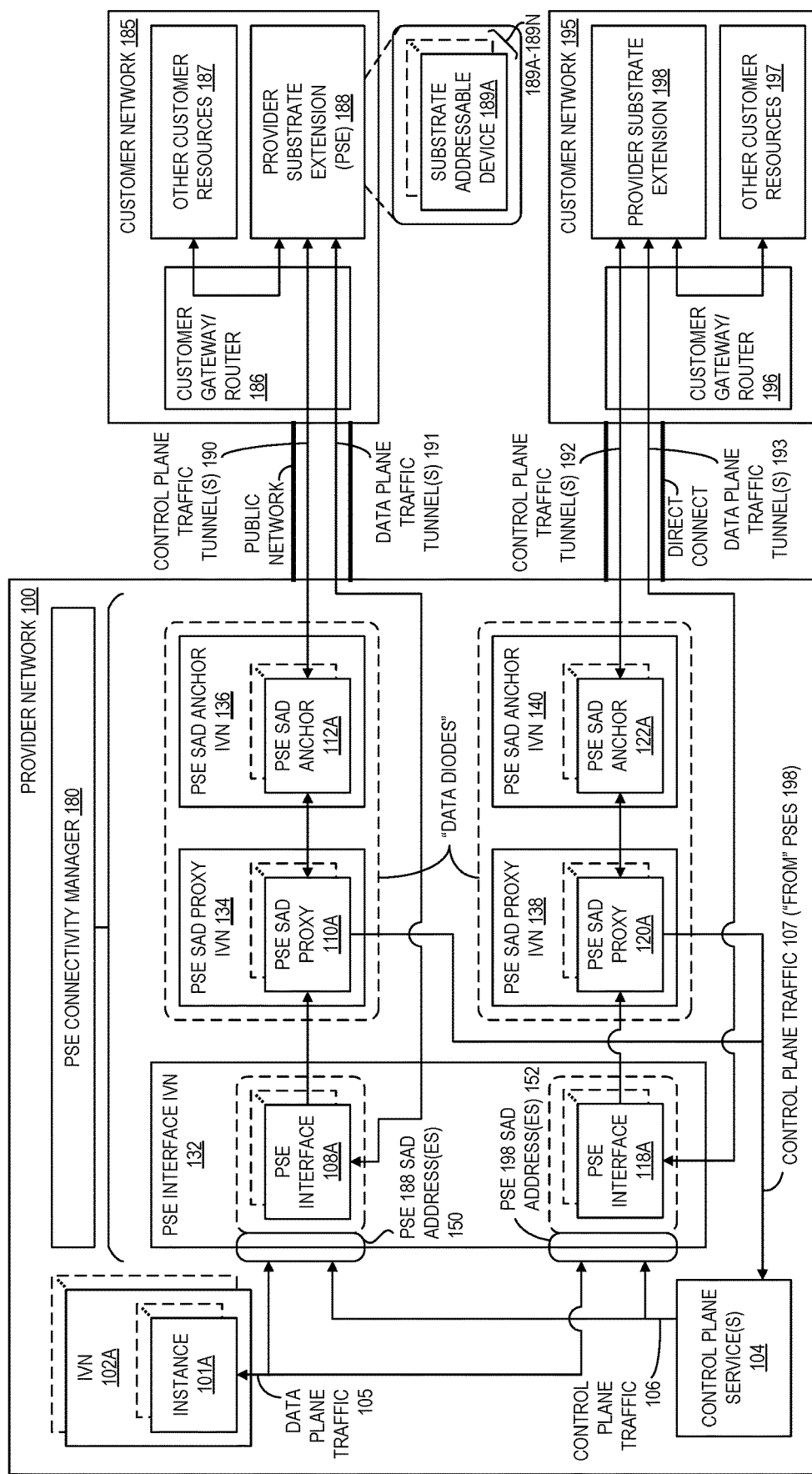
FIG. 1 is a block diagram illustrating an example provider network extended by a provider substrate extension located within a network external to the provider network according to at least some embodiments.

The present disclosure relates to methods, apparatus, systems, and non-transitory computer-readable storage media for configuring a provider substrate extension for communication with a network external to a provider network. A provider network operator (or provider) provides its users (or customers) with the ability to utilize one or more of a variety of types of computing-related resources such as compute resources (e.g., executing virtual machines (VMs) and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services.

Provider network operators often offer these and other computing resources as services that rely upon virtualization techniques. For example, virtualization technologies may be used to provide users the ability to control or utilize compute instances (e.g., a VM using a guest operating system (OS) that operates using a hypervisor that may or may not further operate on top of an underlying host OS, a container that may or may not operate in a VM, an instance that can execute on "bare metal" hardware without an underlying hypervisor), where one or multiple compute instances can be implemented using a single electronic device. Thus, a user may directly utilize a compute instance provided by an instance management service (sometimes called a hardware virtualization service) hosted by the provider network to perform a variety of computing tasks. Additionally or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The resources that support both the services offering computing-related resources to users and those computing-related resources provisioned to users may be generally referred to as the provider network substrate. Such resources typically include hardware and software in the form of many networked computer systems. The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources. The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

While some customer applications are readily migrated to a provider network environment, some customer workloads need to remain on premises ("on-prem") due to low latency, high data volume, data security, or other customer data processing requirements. Exemplary on-prem environments include customer data centers, robotics integrations, field locations, co-location facilities, telecommunications facilities (e.g., near cell towers), and the like. To satisfy customer requirements, the present disclosure relates to the deployment of a substrate-like resources on-prem. The term "provider substrate extension" (PSE) refers to a collection of resources (e.g., hardware, software, firmware, configuration metadata, and the like) that a customer can deploy on-prem (such as in a geographically separate location from the provider network) but that provides the same or similar functionality (e.g., virtualized computing resources) as are provided in the provider network. Such resources may be physically delivered as one or more computer systems or servers delivered in a rack or cabinet such as those commonly found in on-prem locations. The PSE can provide the customer with a set of features and capabilities that can be deployed on-prem similar to those features of a provider network described above. In effect, from the perspective of a customer of a provider network, a PSE represents a local extension of the capabilities of the provider network that can be set up at any desired physical location that can accommodate a PSE (e.g., with respect to physical space, electrical power, internet access, etc.). From the perspective of the provider network itself, a PSE may be considered to be virtually located in the same provider network data centers as the core provider network substrate while being physically located in a customer-selected deployment site. In at least some embodiments, the customer that is physically hosting the PSE can grant permissions to its own customers (e.g., other users of the provider network) to allow those users to launch instances to host their respective workloads within the PSE at the customer's on-prem location and, in some cases, to allow those workloads to access the customer's network.

In at least some embodiments, a PSE may be pre-configured, e.g., by the provider network operator, with the appropriate combination of hardware, software and/or firmware elements to support various types of computing-related resources, and to do so in a manner that meets various local data processing requirements without compromising the security of the provider network itself or of any other customers of the provider network. In at least some embodiments, a PSE generally is managed through the same or a similar set of interfaces that the customer would use to access computing-related resources of within the provider network. For example, the customer can provision, manage, and operate computing-related resources within their on-prem PSE or PSEs at various deployment sites through the provider network using the same application programming interfaces (APIs) or console-based interface that they would otherwise use to provision, manage, and operate computing-related resources within the provider network.

In at least some embodiments, resources of the provider network instantiate various networking components to ensure secure and reliable communications between the provider network and the PSE. Such components can establish one or more secure tunnels (e.g., VPNs) with the PSE. Such components can further divide control plane traffic and data plane traffic and process each type of traffic differently based on factors including the direction of the traffic (e.g., to or from the PSE). In at least some embodiments, a control plane service dynamically provisions and configures these networking components for deployed PSEs. Such a control plane service can monitor the networking components for each PSE and invoke self-healing or repair mechanisms designed to prevent communications with the PSE from being lost due to faults occurring within the provider network.

To leverage the proximity of the PSE to the on-prem deployment site (relative to the less proximate data centers of the provider network), the PSE offers a variety of connectivity options to allow other resources of the customer (i.e., connected to the customer's on-prem network) to communicate with computing-related resources hosted by the PSE. In at least some embodiments, a PSE gateway manages communications between the PSE and the other customer resources. The customer can configure the PSE gateway by issuing one or more API calls to an interface of the provider network which results in control plane commands being sent to the PSE. The PSE in turn handles traffic sent or relayed to the PSE by other devices in the customer's on-prem site and vice versa.

The disclosed systems and techniques also shield the provider network from potential security issues that could be enabled by connecting a PSE to the provider network. In some embodiments, PSEs can require secure networking tunnels from the customer site at which they are installed to the provider network substrate (e.g., the physical network of machines) in order to operate. These tunnels can include virtual infrastructure components hosted both in virtualized computing instances (e.g., VMs) and on the substrate. Examples of tunnel components include VPCs and proxy computing instances and/or containers running on computing instances. Each server in a PSE may use at least two tunnels, one for control plane traffic and one for data plane traffic. As described in further detail below, intermediary resources positioned along the network path between the provider network substrate and the PSE can securely manage traffic flowing between the substrate and the PSE.

While the deployment of a PSE on-prem reduces delay between computing-related resources hosted by the PSE and other on-prem customer resources, it introduces delay when PSE-hosted resources attempt to access data in the data centers of the provider network, particularly when the connection between the PSE and the provider network is low bandwidth, high latency, or otherwise unreliable. For example, virtual-machine based compute instances often launch using a machine image, which can have a large data footprint relative to the finite bandwidth of the secure communications channel between the PSE and the provider network. As a result, launching a virtual machine within the PSE based on a machine image resident in the provider network can take significantly longer than launching a virtual machine within the provider network itself—sometimes by an order of magnitude or more. Embodiments of the present disclosure can address such delays using various techniques. In one technique, an object gateway can be deployed in conjunction with the PSE to serve as a gateway for object accesses (e.g., files such as images, machine images, block storage volume snapshots, databases, etc.) using data caching techniques. Various embodiments deploy the object gateway in different ways. For example, an object gateway can be hosted by the resources of the PSE, by another on-prem server, or by a storage expansion device (SED) that provides additional resources for a PSE, including some compute capacity and additional non-volatile storage. Object gateways can be configured to cache certain object stores (e.g., a logical entity that stores objects and associated metadata in a provider network somewhat like a folder in a file system) using different caching modes.

Another technique for addressing data access delays between the PSE and provider network involves circumventing the finite bandwidth of the secure communications channel between the PSE and the provider network. In particular, a customer can order a SED for the PSE via a service of the provider network, including specifying that the SED is to be preloaded with certain data. The service can load the SED with the specified data, and the provider network operator can ship the SED to the customer. After connecting the SED to the PSE, instances and other computing-related resources hosted by the PSE can access the data stored on the SED thereby avoiding the bottleneck of the secure communications channel between the PSE and the provider network. Additionally, once on-prem, the customer can deploy an object gateway using the resources of the SED to avoid consuming the resources of the PSE.

In at least some embodiments, the provider network is a cloud provider network. A cloud provider network, or "cloud," refers to a large pool of accessible virtualized computing resources (such as compute, storage, and networking resources, applications, and services). The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). A PSE as described herein can also connect to one or more availability zones via a publicly accessible network.

The cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

As one skilled in the art will appreciate in light of this disclosure, certain embodiments may be capable of achieving various advantages, including some or all of the following: (a) enabling customers of a provider network operator to deploy a wide variety of applications in a location-independent manner using provider-managed infrastructure (e.g., PSEs) at sites selected by customers while still retaining the scalability, security, availability and other operational advantages made possible by a provider network, (b) reducing the amount of application data and results that have to be transferred over long distances, such as over links between customer data centers and provider network data centers, (c) improving the overall latencies and responsiveness of applications for which potentially large amounts of data may be consumed as input or produced as output, by moving the applications close to the data sources/destinations, and/or (d) improving the security of sensitive application data.

FIG. 1 is a block diagram illustrating an example provider network extended by a provider substrate extension located within a network external to the provider network according to at least some embodiments. Within a provider network 100, customers can create one or more isolated virtual networks 102. Customers can launch compute instances 101 within an IVN to execute their applications. These compute instances 101 are hosted by substrate addressable devices (SADs) that are part of the provider network substrate (not shown). Similarly, SADs that are part of the provider network substrate can host control plane services 104. Exemplary control plane services 104 include an instance management service (sometimes referred to as a hardware virtualization service) that allows a customer or other control plane service to launch and configure instances and/or IVNs, an object storage service that provides object storage, a block storage service that provides the ability to attach block storage devices to instances, database services that provide various database types, etc.

Note that the components illustrated within the provider network 100 can be treated as logical components. As mentioned, these components are hosted by the SADs of the provider network substrate (not shown). For example, the provider network substrate can host the instances 101 using containers or virtual machines that operate within isolated virtual networks (IVNs). Such containers or virtual machines are executed by SADs. As another example, the provider network substrate can host one or more of the control plane services 104 using SADs in a bare metal configuration (e.g., without virtualization). In at least some embodiments, a SAD refers to the software (e.g., a server) executed by the hardware that is addressable via a network address of the provider network rather than of another network (e.g., a customer network, an IVN, etc.). In at least some embodiments, a SAD may additionally refer to the underlying hardware (e.g., computer system) executing the software.

As illustrated, the provider network 100 is in communication with a provider substrate extension (PSE) 188 deployed within customer network 185 and a PSE 198 deployed within customer network 195. Each PSE includes one or more substrate addressable devices (SADs), such as SADs 189A-189N illustrated within PSE 188. Such SADs 189 facilitate the provisioning of computing-related resources within the PSE. Note that the illustration of a solid box-ellipses-dashed box combination for a component, such as is the case for SADs 189A-189N, generally is used to indicate that there may be one or more of those components in this and subsequent drawings (although references in the corresponding text may refer to the singular or plural form of the component and with or without the letter suffix). A customer gateway/router 186 provides connectivity between the provider network 100 and the PSE 188 as well as between the PSE 188 and other customer resources 187 (e.g., other on-prem servers or services connected to the customer network 185). Similarly, a customer gateway/router 196 provides connectivity between the provider network 100 and the PSE 198 as well as between the PSE 198 and other customer resources 197. Various connectivity options exist between the provider network 100 and PSEs 198, such as a public network like the internet as shown for PSE 188 or a direct connection as shown for PSE 198.

Within the provider network 100, control plane traffic 106 generally (though not always) is directed to SADs, while data plane traffic 104 generally (though not always) is directed to instances. For example, some SADs can vend an API that allows for the launch and termination of instances. A control plane service 104 can send a command via the control plane to the API of such a SAD to launch a new instance in IVN 102.

An IVN, as suggested by the name, may comprise a set of hosted (e.g., virtualized) resources that is logically isolated or separated from other resources of the provider network (e.g., other IVNs). A control plane service can set up and configure IVNs, including assigning each IVN an identifier to distinguish it from other IVNs. The provider network can offer various ways to permit communications between IVNs, such as by setting up peering relationships between IVNs (e.g., a gateway in one IVN configured to communicate with a gateway in another IVN).

IVNs can be established for a variety of purposes. For example, an IVN may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN (or more generally from outside the IVN).

Tunneling techniques facilitate the traversal of IVN traffic between instances hosted by different SADs on the provider network 100. For example, a newly launched instance within IVN 102 might have an IVN address A and be hosted by a SAD with a substrate address X, while the instance 101 might have IVN address B and be hosted by a SAD with a substrate address Y. To facilitate communications between these compute instances, SAD X encapsulates a packet sent from the newly launched instance to the instance 101 (from IVN address A to IVN address B) within a payload of a packet having addressing information of the SADs that host the respective instances (from substrate address X to substrate address Y). The packet sent between the SADs can further include an identifier of IVN 102 to indicate the data is destined for IVN 102 as opposed to another IVN hosted by the SAD with substrate address Y. In some embodiments, the SAD further encrypts the packet sent between instances within the payload of the packet sent between SADs using an encryption key associated with the IVN. In at least some embodiments, the encapsulation and encryption are performed by a software component of the SAD hosting the instance.

For PSEs, the provider network 100 includes one or more networking components to effectively extend the provider network substrate outside of the provider network 100 to the PSE connected to the customer's on-prem network. Such components can ensure that data plane and control plane operations that target a PSE are securely, reliably, and transparently communicated to the PSE. In the illustrated embodiment, a PSE interface 108, a PSE SAD proxy 110, and a PSE SAD anchor 112 facilitate data and control plane communications between the provider network 100 and the PSE 188. Similarly, a PSE interface 118, a PSE SAD proxy 120, and a PSE SAD anchor 122 facilitate data and control plane communications between the provider network 100 and the PSE 198. As described herein, PSE interfaces receive control and data plane traffic from the provider network, send such control plane traffic to a PSE SAD proxy, and send such data plane traffic to a PSE. PSE interfaces also receive data plane traffic from the PSE and send such data plane traffic to the appropriate destination within the provider network. PSE SAD proxies receive control plane traffic from PSE interfaces and send such control plane traffic to PSE SAD anchors. PSE SAD anchors receive control plane traffic from PSE SAD proxies and send such control plane traffic to a PSE. PSE SAD anchors also receive control plane traffic from a PSE and send such control plane traffic to a PSE SAD proxy. PSE SAD proxies also receive control plane traffic from PSE SAD anchors and send such control plane traffic to the appropriate destination within the provider network. Other embodiments may employ different combinations or configurations of networking components to facilitate communications between the provider network 100 and PSEs (e.g., the functionality of the PSE interface, PSE SAD proxy, and/or PSE SAD anchors may be combined in various ways such as by an application that performs the operations of both a PSE interface and a PSE SAD proxy, of both a PSE SAD proxy and a PSE SAD anchor, of all three components, and so on).

As indicated above, each PSE has one or more substrate network addresses for the SADs (e.g., SADs 189A-189N). Since those substrate addresses are not directly reachable via the provider network 100, the PSE interfaces 108, 118 masquerade with attached virtual network addresses (VNAs) matching the substrate addresses of the respective PSE. As illustrated, the PSE interface 108 has attached VNA(s) 150 that match the PSE 188 SAD address(es), and the PSE interface 118 has attached VNA(s) 152 that match the PSE 198 SAD address(es)). For example, traffic destined for a SAD with Internet Protocol (IP) address 192.168.0.10 within PSE 188 is sent to PSE interface 108 having an attached virtual address of 192.168.0.10, and traffic destined for a SAD with IP address 192.168.1.10 within PSE 198 is sent to PSE interface 118 having an attached virtual address of 192.168.1.10. Note that IPv4 or IPv6 addressing may be used. In at least some embodiments, a VNA is a logical construct enabling various networking-related attributes such as IP addresses to be programmatically transferred between instances. Such transfers can be referred to as "attaching" a VNA to an instance and "detaching" a VNA from an instance.

At a high level, a PSE interface is effectively a packet forwarding component that routes traffic based on whether that traffic is control plane traffic or data plane traffic. Note that both control and data plane traffic are routed to a PSE interface as both are destined for a SAD given the substrate addressing and encapsulation techniques described above. In the case of control plane traffic, a PSE interface routes the traffic to the PSE SAD proxy based on the SAD address. In the case of data plane traffic, a PSE interface establishes and serves as an endpoint to one or more encrypted data plane traffic tunnels between the provider network 100 and PSEs (e.g., tunnel 191 between PSE interface 108 and PSE 188, tunnel 193 between PSE interface 118 and PSE 198). For data plane traffic received from the provider network 100, a PSE interface encrypts the traffic for transmission over the tunnel to the PSE. For data plane traffic received from the PSE, the PSE interface decrypts the traffic, optionally validating the SAD-addressing of the packets, and sends the traffic to the identified SAD destination via the provider network 100. Note that if the PSE interface receives traffic from the PSE that does not conform to the expected format (e.g., protocol) used to transmit data plane traffic, the PSE interface can drop such traffic. Further note that if the PSE interface can validate addressing of the encapsulated packet to ensure that the originator of the traffic (e.g., an instance hosted by the PSE within a particular IVN) is permitted to send traffic to the addressed destination (e.g., an instance hosted by provider network within the same or a different IVN).

Each SAD in the PSE has a corresponding group of one or more PSE interfaces and each member of the group establishes one or more tunnels for data plane traffic with the PSE. For example, if there are four PSE interfaces for a PSE having four SADs, the PSE interfaces each establish a secure tunnel with a data plane traffic endpoint for each of the SADs (e.g., sixteen tunnels). Alternatively, a group of PSE interfaces may be shared by multiple SADs by attaching the associated VNAs to each member of the group.

Each PSE has one or more PSE SAD proxies and one or more PSE SAD anchors that handle control plane traffic between the provider network 100 and the SADs of a PSE. Control plane traffic typically has a command-response or request-response form. For example, a control plane service of the provider network 100 can issue a command to a PSE SAD to launch an instance. Since management of PSE resources is facilitated from the provider network, control plane commands sent over the secure tunnel typically should not originate from a PSE. At a high level, a PSE SAD proxy acts as a stateful security boundary between the provider network 100 and a PSE (such a boundary is sometimes referred to as a data diode). To do so, a PSE SAD proxy can employ one or more techniques such as applying various security policies or rules to received control plane traffic. Note that other control plane services 104 can indirectly or directly offer a public-facing API to allow instances hosted by a PSE to issue commands to the provider network 100 via non-tunneled communications (e.g., over a public network such as the internet).

For traffic originating from within the provider network 100 and destined for a PSE, a PSE SAD proxy can provide a control plane endpoint API of its corresponding SAD within the PSE. For example, a PSE SAD proxy for a PSE SAD that can host instances can provide an API consistent with one that can receive control plane operations to launch, configure, and terminate instances. Depending on the API call and associated parameters destined for a PSE SAD and received by a PSE SAD proxy, the PSE SAD proxy can perform various operations. For some operations, the PSE SAD proxy can pass the operation and associated parameters without modification through to the destination SAD. In some embodiments, a PSE SAD proxy can verify that the parameters of a received API call from within the provider network 100 are well-formed relative to the API before passing through those operations.

For some API calls or associated parameters, the PSE SAD can act as an intermediary to prevent sensitive information from being sent outside of the provider network 100. Exemplary sensitive information includes cryptographic information such as encryption keys, network certificates, etc. For example, a PSE SAD proxy can decrypt data using a sensitive key and re-encrypt the data using a key that can be exposed to a PSE. As another example, a PSE SAD proxy can terminate a first secure session (e.g., a Transport Layer Security (TLS) Session) originating from within the provider network 100 and create a new secure session with the corresponding SAD using a different certificate to prevent provider network certificates from leaking to the PSE. Thus, a PSE SAD proxy can receive certain API calls from within the provider network 100 that includes sensitive information and issue a substitute or replacement API call to the PSE SAD that replaces the sensitive information.

For traffic originating from a PSE and destined for the provider network 100, a PSE SAD proxy can drop all control plane commands or requests that originate from the PSE or only those commands or requests not directed to a public-facing control plane endpoint within the provider network, for example.

In some embodiments, a PSE SAD proxy can process responses to control plane operations depending on the nature of an expected response, if any. For example, for some responses, the PSE SAD proxy can simply drop the response without sending any message to the originator of the corresponding command or request. As another example, for some responses the PSE SAD proxy can sanitize the response to ensure it complies with the expected response format for the corresponding command or request before sending the sanitized response to the originator of the corresponding command or request via control plane traffic 107. As yet another example, the PSE SAD proxy can generate a response (whether immediately or upon receipt of an actual response from the SAD) and send the generated response to the originator of the corresponding command or request via control plane traffic 107.

As part of acting as a security boundary between the provider network 100 and a PSE, a PSE SAD proxy can track the state of communications between components of the provider network (e.g., control plane services 104) and each SAD of the PSE. State data can include session keys for the duration of sessions, pending outbound API calls with an associated source and destination to track outstanding responses, the relationship between API calls received from within the provider network 100 and those API calls that were issued to a SAD with replaced or substituted sensitive information, etc.

In some embodiments, the PSE SAD proxy can provide stateful communications for other PSE-to-provider network communications in addition to control plane traffic. Such communications can include Domain Name System (DNS) traffic, Network Time Protocol (NTP) traffic, and operating system activation traffic (e.g., for Windows activation).

In some embodiments, only certain components of a PSE are capable of serving as endpoints for encrypted control plane traffic tunnels with the provider network 100. To provide redundancy and reliability for the connection between the provider network 100 and PSE, a PSE SAD anchor can serve as the provider-network side endpoint for each of the available tunnel endpoints of the PSE. As illustrated, PSE SAD anchor(s) 112 serve to tunnel control plane traffic to the PSE 188 via tunnel 190, and PSE SAD anchor(s) 122 serve to tunnel control plane traffic to the PSE 1198 via tunnel 192.

Various embodiments can limit the radial impact of any attempted attacks originating from outside of the provider network (e.g., should a PSE become comprised) both by using the techniques to process traffic described above as well as by isolating those networking components exposed to traffic from other portions of the provider network 100. In particular, the networking components can operate within one or more IVNs to bound how far an attacker could penetrate thereby protecting both the operations of the provider network and of other customers. Accordingly, various embodiments can instantiate the PSE interfaces, PSE SAD proxies, and the PSE SAD anchors as applications executed by virtual machines or containers that execute within one or more IVNs. In the illustrated embodiment, groups of PSE interfaces for different PSEs run within a multi-tenant IVN (e.g., the PSE interface IVN 132 for PSEs 188 and 198). In other embodiments, each group of PSE interfaces can run in a single-tenant IVN. Furthermore, each group of PSE SAD proxies and each group of PSE SAD anchors for a given PSE run within single-tenant IVNs (e.g., the PSE SAD proxy IVN 134 for PSE 188, the PSE SAD anchor IVN 136 for PSE 188, the PSE SAD proxy IVN 138 for PSE 198, and the PSE SAD proxy IVN 40 for PSE 198).

Note that the redundancy provided by operating multiple instances for each of the networking components (e.g., PSE interfaces, PSE SAD proxies, and PSE SAD anchors) allows the provider network to periodically recycle the instances hosting those components without interrupting PSE-to-provider network communications. Recycling can involve, for example, restarting instances or launching new instances and reconfiguring the other instances with, for example, the address of the recycled instance. Periodic recycling limits the time window during which an attacker could leverage a compromised network component should one become compromised.

A PSE connectivity manager 180 manages the setup and configuration of the networking components providing the connectivity between the provider network 100 and the PSEs. As mentioned above, the PSE interfaces 108, 118, the PSE SAD proxies 110, 120, and the PSE SAD anchors 112, 122 can be hosted as instances by the provider network substrate. The PSE connectivity manager 180 can request or initiate the launch of PSE interface(s), PSE SAD proxy/proxies, and PSE SAD anchor(s) for PSEs as PSEs are shipped to customers and/or as those PSEs come online and exchange configuration data with the provider network. Furthermore, the PSE connectivity manager 180 can further configure the PSE interface(s), PSE SAD proxy/proxies, and PSE SAD anchor(s). For example, the PSE connectivity manager 180 can attach the VNA(s) that correspond to the SADs of the PSE to the PSE interface(s), provide the PSE interface(s) with the address of the PSE SAD proxy/proxies for the PSE SADs, and provide the PSE SAD proxy/proxies with the address of the PSE SAD anchor(s) for the PSE. Furthermore, the PSE connectivity manager 180 can configure the IVNs of the various components to allow, for example, communications between the PSE interface IVN 132 and a PSE SAD proxy IVN for the PSE, and between the PSE SAD proxy IVN to the PSE SAD anchor IVN for the PSE.

Note that to facilitate the establishment of tunnels 190-193, the tunnel endpoints can have one or more attached VNAs or assigned physical network addresses that can receive traffic from outside of their respective network (e.g., from outside of the provider network for PSE interfaces and PSE SAD anchors, from outside of the customer network for the tunnel endpoints of the PSE). For example, the PSE 188 can have a single outward-facing network address and manage communications to multiple SADs using port address translation (PAT) or multiple outward-facing network addresses. Each PSE SAD anchor 112, 122 can have or share (e.g., via PAT) an outward-facing network address, and each PSE interface 108, 118 can have or share (e.g., via PAT) an outward-facing accessible network address.

Figure 2:
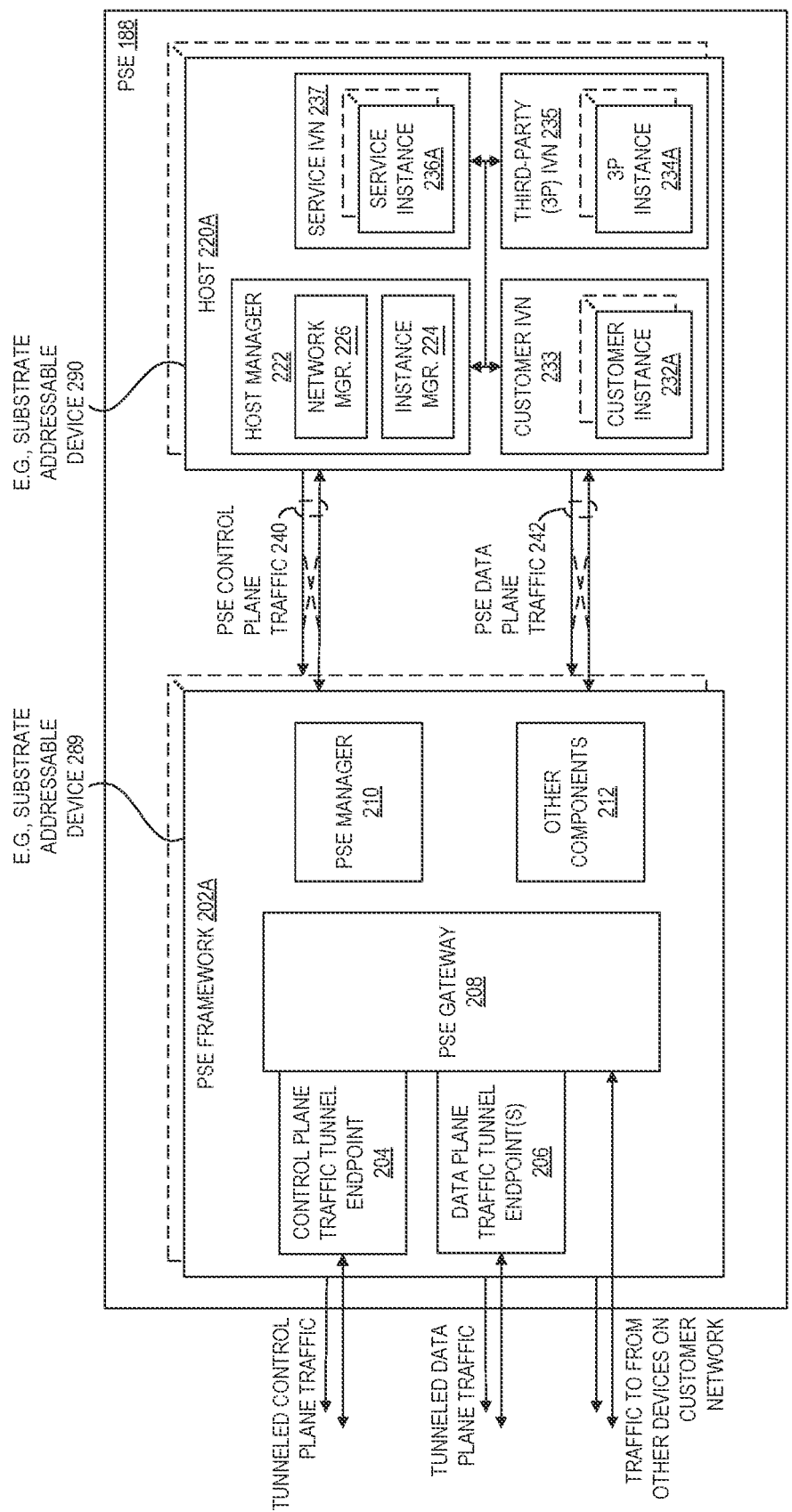
FIG. 2 is a block diagram illustrating an example provider substrate extension according to at least some embodiments.

FIG. 2 is a block diagram illustrating an example provider substrate extension according to at least some embodiments. In the illustrated embodiment, the PSE 188 includes one or more PSE frameworks 202 and one or more hosts 220. At a high level, each host 220 can be functionally (and, possibly, structurally) similar to at least some of the computer systems that form portions of the provider network substrate (e.g., those substrate resources that host instances within the provider network), while the PSE framework(s) 202 provide supporting infrastructure to emulate the provider network substrate within the PSE as well as to provide connectivity to the provider network via control and data plane traffic tunnels (e.g., tunnels 190-193 of FIG. 1).

In at least some embodiments, each PSE framework 202 can send or receive control or data plane traffic from each host 220 and vice versa in a mesh like architecture, as indicated by PSE control plane traffic 240 and PSE data plane traffic 242. Such redundancy allows for reliability levels that a customer might expect from the provider network.

The PSE framework 202 includes one or more control plane tunnel endpoints 204 that terminate encrypted tunnels carrying control plane traffic (e.g., tunnel 190, tunnel 192). In some embodiments, the provider network 100 hosts a PSE SAD anchor for each control plane tunnel endpoint 204. Back in the provider network, the PSE SAD proxy or proxies (e.g., proxies 110) can distribute control plane traffic to the PSE SAD anchors (e.g., anchors 112), effectively distributing the loading of control plane traffic across the PSE frameworks 202 of the PSE 188. The PSE framework 202 further includes one or more data plane tunnel endpoints 206 that terminate encrypted tunnels carrying data plane traffic (e.g., tunnel 191, tunnel 193) from the PSE interfaces of the provider network, which may be connected in a mesh like architecture (e.g., a given PSE interface 108 establishes a tunnel with the data plane tunnel endpoint 206 of each PSE framework 202).

As indicated above, packets of control plane traffic and packets of data plane traffic can include SADs as both source and destinations—the latter being encapsulated in a packet having SAD-based addressing. As illustrated, the PSE framework 202 is SAD 289, and the host 220 is SAD 290. Note that SADs within the PSE 188 (e.g., SAD 289, 290) can also provide secure session termination (e.g., TLS termination) for secure sessions established with the corresponding PSE SAD proxy or proxies within the provider network (e.g., PSE SAD proxies 110).

SADs vend one or more control plane APIs to handle control plane operations directed to the SAD that manage the resources of the SAD. For example, a PSE manager 210 of a PSE framework 202 can vend a control plane API for management of the components of the PSE framework 202. One such component is a PSE gateway 208 that routes control and/or data plane traffic into and out of the PSE 188, such as control plane traffic destined for SAD 289 to the PSE manager 210 and control or data plane traffic destined for SAD 290 to the host manager 222. The PSE gateway 208 can further facilitate communications with the customer network, such as to or from the other customer resources 187 accessible via the network of the PSE deployment site (e.g., the customer network 185).

The API of the PSE manager 210 can include one or more commands to configure the PSE gateway 208 of the PSE framework 202. Other components 212 of the PSE framework 202 can include various applications or services that take part in the operation of the substrate of the PSE for the hosts 220, such as DNS, Dynamic Host Configuration Protocol (DHCP), and/or NTP services.

A host manager 222 can vend a control plane API for management of the components of the host 220. In the illustrated embodiment, the host manager 222 includes an instance manager 224 and a network manager 226. The instance manager 224 can handle API calls related to management of the host 220, including commands to launch, configure, and/or terminate instances hosted by the host 220. For example, an instance management service in the provider network (not shown) can issue a control plane command to the instance manager 224 to launch an instance on host 220. As illustrated, the host 220 is host to a customer instance 232 running inside of a customer IVN 233, a third-party (3P) instance 234 running inside of a 3P IVN 235, and a service instance 236 running inside of a service IVN 237. Note that each of these IVNs 233, 234, 235 can extend existing IVNs established within the provider network. The customer instance 232 may be executing some customer application or workload, the 3P instance 234 may be executing the application or workload of another party that the customer has permitted to launch instances within the PSE 188, and the service instance 236 may be executing a service of the provider network locally to offer to the PSE 188 (e.g., a block storage service, a database service, etc.).

The network manager 226 can handle SAD-addressed data plane traffic received by the host 220. For such traffic, the network manager can perform the requisite decapsulation of an IVN packet before sending it to the addressed, hosted instance. Furthermore, the network manager 226 can handle the routing of traffic sent by hosted instances. When a hosted instance attempts to send traffic to another locally hosted instance (e.g., on the same host), the network manager 226 can forward that traffic to the addressed instance. When a hosted instance attempts to send traffic to a non-local instance (e.g., not on the same host), the network manager 226 can locate the substrate address of the device hosting the non-local instance, encapsulate and optionally encrypt the corresponding packet into a SAD-addressed packet, and send that packet over the data plane (e.g., either to another host within the PSE or back to the provider network via the PSE gateway 208. Note that the network manager 226 can include or have access to various data that facilitates routing of data plane traffic (e.g., to look up the address of the SAD hosting an instance having a IVN network address in the destination of a packet received from a hosted instance).

Figure 3:
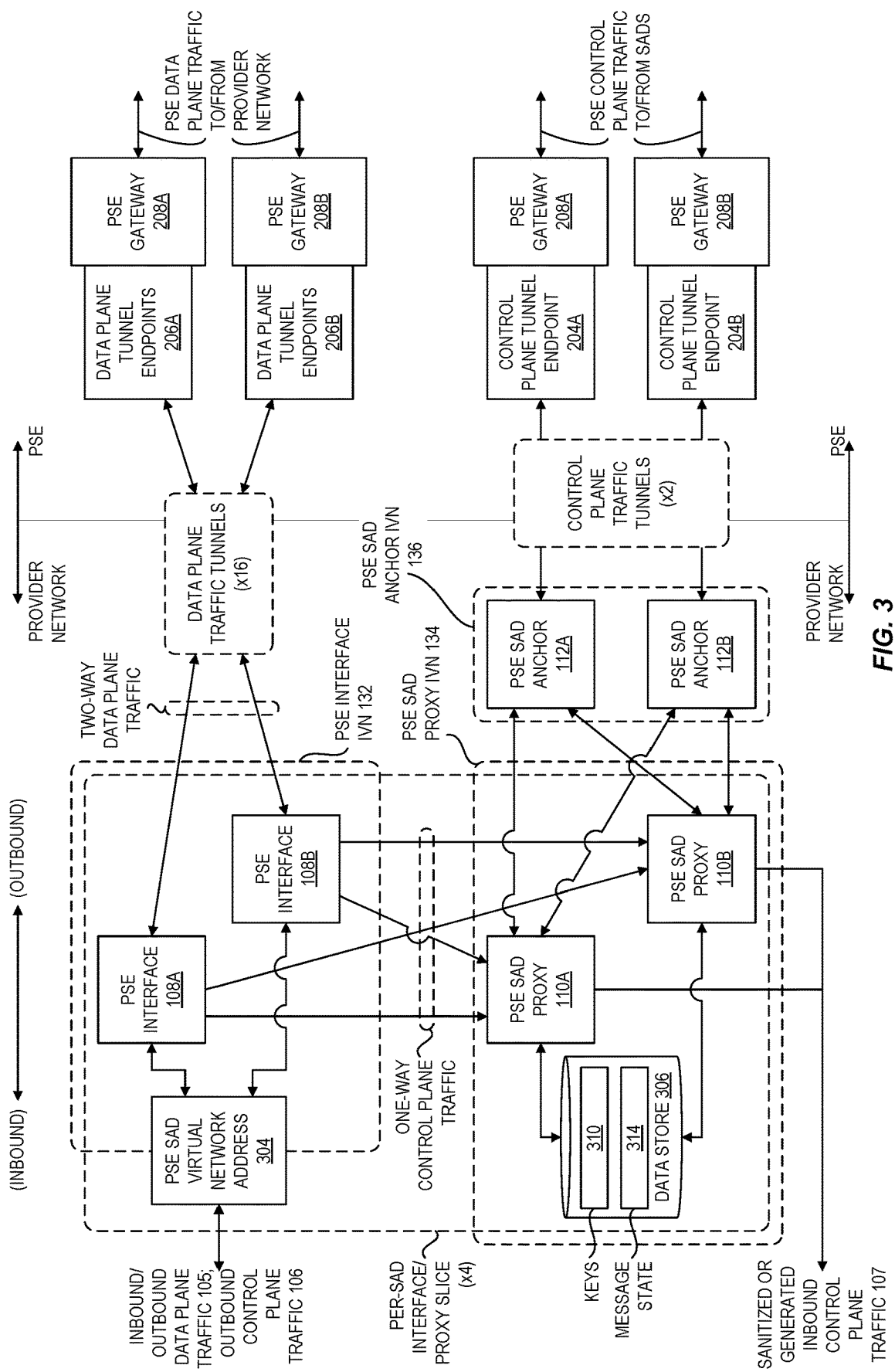
FIG. 3 is a block diagram illustrating an example connectivity between a provider network and a provider substrate extension according to at least some embodiments.

FIG. 3 is a block diagram illustrating an example connectivity between a provider network and a provider substrate extension according to at least some embodiments. In particular, FIG. 3 illustrates an exemplary connectivity between a provider network and a PSE. Note that for FIG. 3, and as indicated at the top of the figure, the term "inbound" refers traffic received by the provider network from the PSE, and the term "outbound" refers to traffic sent by the provider network to the PSE. Although not illustrated, for this example assume the PSE includes two PSE frameworks 202 and two hosts 220 for a total of four SADs. The PSE frameworks provide tunnel endpoints 204A, 204B for control plane traffic tunnel endpoints 206A, 206B for data plane traffic. Outbound traffic is decrypted and sent to the destination within the PSE substrate via the PSE gateways 208A, 208B.

For each of the four SADs, the provider network includes a VNA, one or more PSE interfaces, and one or more PSE SAD proxies. In this example, the provider network includes a PSE SAD VNA 304, two PSE interfaces 108A, 108B and two PSE SAD proxies 110A, 110B for a given PSE SAD. Together, the PSE interface(s) and PSE SAD proxy/proxies can be referred to as a slice as indicated, each slice corresponding to a particular SAD within the PSE. In other embodiments, the PSE interface(s) may be shared by all of the VNAs for a VPN rather than a single VNA for one of the SADs.

The PSE SAD VNA 304 serves as a front for a given PSE through which other components of the provider network can send traffic to and receive traffic from the corresponding SAD of the PSE. A load balancer (not shown) can route outbound traffic sent to the PSE SAD VNA 304 to one of the PSE interfaces 108A, 108B. The illustrated PSE interfaces 108A, 108B for a given slice and those for the other slices (not shown) operate within a PSE interface IVN 132. The PSE interfaces 108A, 108B send data plane traffic to the PSE via data plane traffic tunnels and control plane traffic to the PSE by forwarding the control plane traffic to the PSE SAD proxies 110A, 110B of the slice. The PSE interfaces 108A, 108B store (or have access to) the network addresses of the PSE SAD proxy/proxies of the associated SAD, the network addresses of the data plane tunnel endpoint(s), and one or more keys of or associated with the data plane tunnel endpoint(s) of the PSE for securing communications with those endpoint(s).

In at least some embodiments, the PSE interfaces 110A, 110B establish a secure tunnel for data plane traffic with each data plane tunnel endpoint 206A, 206B resulting in N data plane tunnels where N is the number of PSE interfaces per-SAD (assuming each SAD has the same number of interfaces) multiplied by the number of data plane tunnel endpoints multiplied by the number of SADs. In this example, sixteen data plane tunnels are established between the PSE interfaces and the data plane tunnel endpoints (i.e., 2 PSE interfaces per-SAD×2 data plane tunnel endpoints×4 SADs).

The PSE SAD proxies 110A, 110B receive control plane traffic from the PSE interfaces 108A, 108B, perform various operations described elsewhere herein, and send the control plane traffic to the PSE via either of the two PSE SAD anchors 112A, 112B. Similarly, the PSE SAD proxies 110A, 110B receive control plane traffic from either of the two PSE SAD anchors 112A, 112B, perform various operations described elsewhere herein, and control plane traffic 107 to destinations within the provider network. The illustrated PSE SAD proxies 110A, 110B for a given slice and those for the other slices (not shown) operate within a PSE SAD proxy IVN 134. The PSE interfaces 108A, 108B store (or have access to) the network addresses of the PSE SAD anchor(s).

In at least some embodiments, the PSE SAD proxies have access to a shared data store 306 or otherwise are capable of exchanging information. Such information exchange can be used for a number of reasons. For example, recall that the PSE SAD proxies can vend an API interface to emulate the API interface of the associated SAD within the PSE. Since some communications can be stateful and various load balancing techniques may prevent the same PSE SAD proxy from handling all communications for a given set of operations, one PSE SAD proxy may need to access the state of communications that were previously handled by a different PSE SAD proxy (e.g., the PSE SAD proxy 110A sends a control plane operation to the PSE and the PSE SAD proxy 110B receives a response to the control plane operation from the PSE). For inbound control plane traffic, the PSE SAD proxies can check whether the inbound message is consistent with the expected state and, if so, send a message via control plane traffic 107 as described elsewhere herein. If not, the PSE SAD proxies 110A, 110B can drop the traffic. As another example, recall that the PSE SAD proxies can bridge separate secure sessions (e.g., TLS sessions) to prevent provider network certificates from being sent to the PSE. Again, since the PSE SAD proxy that handles an outbound message may be different than the PSE SAD proxy that handles the response to that message, the PSE SAD proxy handling the responsive message can use the same key that was established between the originator of the outbound message and the PSE SAD proxy that handled the outbound message in order to send a secure responsive message via control plane traffic 107 to the originator.

In this example, each PSE framework provides for a single control plane tunnel endpoint 204. For each of the available control plane tunnel endpoints 204, the provider network includes a PSE anchor. In this example, the provider network includes two PSE anchors 112A, 112B. The PSE SAD anchors 112A, 112B operate within a PSE SAD anchor IVN 136. The PSE anchors 112 receive control plane traffic from each of the eight PSE SAD proxies (two per slice for each of the four SADs) and send that traffic to the PSE. The PSE anchors also receive control plane traffic from the PSE and send that traffic to one of the two PSE SAD proxies associated with the SAD that sourced the traffic from the PSE. The PSE anchors 112A, 112B store (or have access to) the network addresses of the PSE SAD proxy/proxies for each SAD, the network addresses of the control plane tunnel endpoint(s) of the PSE, and one or more keys of or associated with the control plane tunnel endpoint(s) of the PSE for securing communications with those endpoint(s).

In at least some embodiments, the network components or provider network may employ load balancing techniques to distribute the workload of routing control and data plane traffic between the provider network and the PSE. For example, traffic sent to the PSE SAD VNA 304 can be distributed among the PSE interfaces 108A, 108B. As another example, each PSE interface 108 can distribute traffic among the data plane tunnel endpoints 206A, 206B. As yet another example, each PSE interface 108 can distribute traffic among the PSE SAD proxies 110A, 110B. As yet another example, each PSE SAD proxy 110 can distribute outbound traffic among the PSE SAD anchors 112A, 112B. As yet another example, the PSE SAD anchors 112 can distribute inbound traffic among the PSE SAD proxies 110A, 110B. In any case, such load balancing can be performed by the sending entity or by a load balancer (not shown). Exemplary load balancing techniques include employing a load balancer with a single VNA that distributes traffic to multiple components "behind" that address, providing each data sender with the address of multiple recipients and distributing the selected recipient at the application level, etc.

Note that although the embodiments illustrated in FIGS. 1-3 show the establishment of separate tunnels for control plane traffic and data plane traffic, other embodiments might employ one or more tunnels for both control and data plane traffic. For example, the PSE interfaces can route data plane traffic to PSE SAD anchors for transmission over a shared tunnel to the PSE, bypassing the additional operations carried out by the PSE SAD proxies on the control plane traffic.

Figure 4:
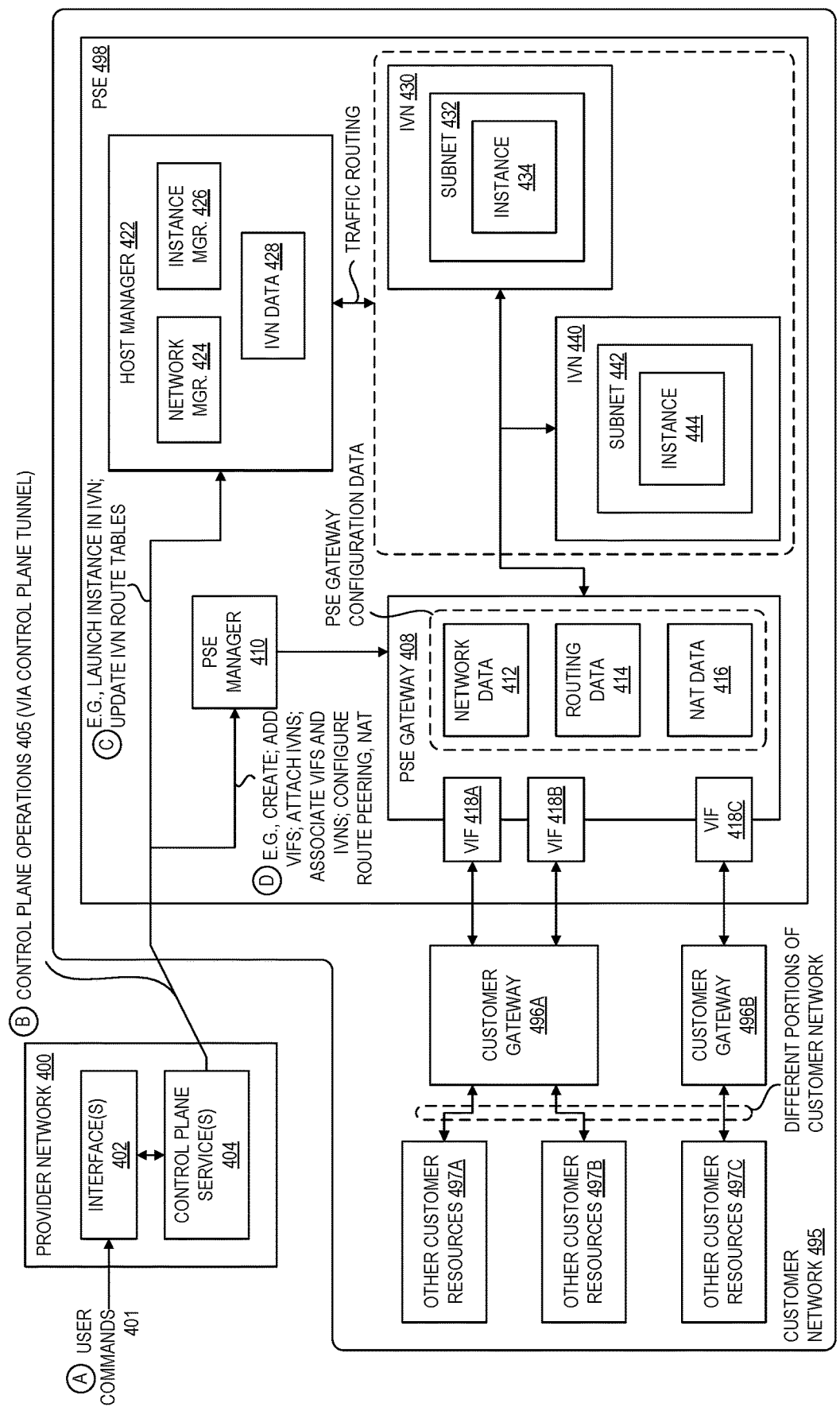
FIG. 4 is a block diagram illustrating an example system environment for configuring a provider substrate extension for communication with a network external to a provider network according to at least some embodiments.

FIG. 4 is a block diagram illustrating an example system environment for configuring a provider substrate extension for communication with a network external to a provider network according to at least some embodiments. As illustrated, a PSE 498 is deployed within a customer network 495. In this example, the customer network 495 includes (or otherwise provides access to) other customer resources 497A, other customer resources 497B, and other customer resources 497C. Other customer resources 497A and 497B are accessible via a customer gateway 496A, and other customer resources 497C are accessible via a customer gateway 496B. The customer establishes communications between instances hosted by the PSE and other customer resources 497 via a PSE gateway 408.

In addition to performing the other functions described herein, the PSE gateway 408 connects on-PSE IVNs to other customer resources 497. In at least some embodiments, a PSE gateway such as PSE gateway 408 operates by attaching virtual network interfaces (VIFs) to the PSE gateway to connect to gateways of the customer network, attaching and associating IVNs with one or more VIFs, and exchanging routing information with the customer gateway(s) connected to attached VIFs and IVNs to generate routing tables. In the illustrated example, the PSE gateway 408 has a VIF 418A to connect to the customer gateway 496A, a VIF 418B to connect to the customer gateway 496A, and a VIF 418C to connect to the customer gateway 496B.

The PSE gateway 408 includes or has access to PSE gateway configuration data, which can include network data 412, routing data 414, and NAT data 416. Exemplary network data 412 tracks VIFs and IVNs attached to the PSE gateway 408 as well as associations between VIFs and IVNs that form networks. Exemplary routing data 414 can include one or more routing tables. For example, a routing table for an attached IVN can include an entry for the CIDR block associated with the IVN and any advertised routes received from customer gateways connected to VIFs associated with the IVN. Exemplary NAT data 416 can include NAT translation tables for NAT-enabled IVNs associated with a VIF (whether using static, dynamic, port address translation, or another NAT techniques).

At a high level, the customer configures or manages the PSE gateway 408 via one or more control plane services 404 of a provider network 400. For example, a customer can issue various commands to a public facing interface 402 of the provider network such as via a console or API. The interface 402 may be part of, or serve as a front-end to, control plane services 404 that include "backend" services supporting and enabling the services and options offered to customers, including the configuration of PSE gateways. Upon receipt of a command to configure a PSE gateway, the interface(s) and/or backend services of the provider network send a control plane message (along with any parameters) to the PSE to configure the PSE gateway 408.

As indicated at circle A, one or more commands are issued to the interface 402 of the provider network 400 (e.g., via an electronic device under control of a customer). Such a command can include zero or more parameters, such as a parameter identifying the particular PSE to which the command applies. For example, a command might be to launch an instance on a specific PSE rather than on the provider network or another PSE of the customer. When a SAD that is part of a PSE is implicated by the command, the control plane service 404 in turn issues one or more control plane operations 405 to the PSE via a control plane tunnel (e.g., tunnel 190, 192) as indicated at circle B. For example, the one control plane operation may be sent to the host manager 422 to launch an instance.

Turning briefly to certain networking aspects of instances running within IVNs, each IVN may be divided into one or more subnets. Each subnet can have an associated route table that governs how traffic originating within the subnet is to be routed. Routing tables for subnets can be stored as part of IVN data 428. An exemplary route table for an IVN subnet follows.

| Destination Address Range | Target |
| --- | --- |
| 10.0.0.0/16 | LOCAL |
| 172.31.0.0/16 | PCX-123456 |
| 192.168.10.0/24 | PSEGW-1a2b3c |
| 0.0.0.0/0 | IGW-11aa22bb |

The above route table includes a route for IPv4 Internet traffic (0.0.0.0/0) that points to an internet gateway with an identifier IGW-11aa22bb, a route for 172.31.0.0/16 IPv4 traffic that points to a peering connection to another IVN with an identifier PCX-123456, and a route for 192.168.10.0/24 IPv4 traffic that points to a PSE gateway with an identifier PSEGW-1a2b3c. Any traffic originating from an instance running within the subnet and destined for a target within the IVN (assuming the IVN has CIDR block 10.0.0.0/16) is covered by the local route and therefore routed within the IVN. Any traffic that is destined for the 172.31.0.0/16 IP address range uses the peering connection. Any traffic destined for the 192.168.10.0/24 address range will be routed to customer network via PSE gateway. All other traffic from the subnet uses the Internet gateway.

As illustrated, an instance 434 is running within a subnet 432 of an IVN 430, and an instance 444 is running within a subnet 442 of an IVN 440. In at least some embodiments, instances connected to a subnet of a given IVN can be hosted within the provider network substrate while instances connected to another subnet of the IVN can be hosted within the PSE. Although not illustrated, in a case where an IVN spans a PSE and provider network, intra-IVN data plane communications are routed between the PSE and provider network via the PSE gateway 408 (e.g., tunnel 191, 193).

The network manager 424 can handle traffic to and from instances hosted by the associated host (not shown) based on route tables stored in IVN data 428. For example, if instances 434 and 444 are hosted on the same host as host manager 422, the network manager 424 can handle the routing and associated operations for traffic to and from those instances. In particular, the network manager 424 can receive and route packets from locally hosted instances according to a route table associated with the IVN or IVN subnet within which the instance operates. Similarly, the network manager 424 can receive SAD-addressed data plane traffic, decapsulate it, and send it to the locally hosted instance.

Returning to the commands that can be used to enable communications between instances hosted by the PSE 498 and the customer network 495, one such interface 402 command allows a user to create a new subnet associated with an existing IVN within a PSE. For example, the user can issue a "create-subnet" command with a "PSE-identifier" parameter having a value that identifies the PSE, an "IVN-identifier" parameter having a value that identifies the existing IVN within which to create the subnet, and a "CIDR-block" parameter having a value that identifies a Classless Inter-Domain Routing (CIDR) block of IP addresses to assign to the subnet (e.g., 10.0.1.0/24).

Another such interface 402 command allows a user to launch instances hosted by the PSE. If the user wants to launch an instance within an existing IVN/subnet, the user can issue a "launch-instance" command with a "PSE-identifier" parameter having a value that identifies the PSE, an "IVN-identifier" parameter having a value that identifies the existing IVN, and a "subnet-identifier" parameter having a value that identifies a particular subnet. If the user wants to launch an instance within a new IVN/subnet, the user can then issue a "launch-instance" command including the "PSE-identifier" parameter and omitting the other parameters to launch an instance hosted by the identified PSE connected to a newly created IVN/subnet. The control plane service 404 associated with the command issues one or more control plane operations to the SAD selected to host the instance such as a host managed by a host manager 422, as indicated at circle C. An instance manager 426 provisions resources on the host for the instance and launches the instance within the IVN and subnet, if specified.

Another such interface 402 command allows a user to update the route table associated with a subnet of a given IVN, a default route table for the IVN, or another route table (e.g., of the PSE gateway 408). The user can issue a "create-route" command including a "route-table-identifier" parameter that identifies the route table to update, a "destination-CIDR-block" to identify the destination for the new route, and a "target-identifier" to identify the target for traffic destined for addresses within the CIDR block. The control plane service 404 associated with the command issues one or more control plane operations to the host manager 422 hosting instances using the specified route table, as indicated at circle C, to update the route table stored in IVN data 428 (e.g., by the network manager 424).

Another such interface 402 command allows a user to enable a PSE gateway (e.g., if not enabled by default). For example, the user can issue a "create-pse-gateway" command with a "PSE-identifier" parameter having a value corresponding to an identifier that identifies the PSE 498 (e.g., PSE-123). The control plane service 404 associated with the command issues one or more control plane operations to the PSE manager 410 to create the PSE gateway 408, as indicated at circle D.

Another such interface 402 command allows a user to create a VIF on a PSE gateway. For example, the user can issue a "create-virtual-interface" command with a "PSE-gateway-identifier" having a value corresponding to the PSE gateway to which the VIF is being attached, a "VIF-name" parameter having a value to name the VIF, a "vlan-identifier" parameter with a unique VLAN tag to facilitate creation of network layer sub-interfaces between PSE gateway and customer gateway, a "local-IP" parameter with a value of the IP address of the PSE gateway, and a "peer-IP" parameter with a value of the IP address of the remote interface of the customer gateway. The control plane service 404 associated with the command issues one or more control plane operations to the PSE manager 410 to create and attach the VIF to the PSE gateway 408 (e.g., by updating network data 412), as indicated at circle D.

Another such interface 402 command allows a user to attach an IVN to a PSE gateway. For example, the user can issue a "create-PSE-gateway-IVN-attachment" command with a "PSE-gateway-identifier" parameter having a value corresponding to the PSE gateway to which the IVN is being attached and an "IVN-identifier" parameter having a value that identifies the IVN to attach. The control plane service 404 associated with the command issues one or more control plane operations to the PSE manager 410 to attach the IVN to the PSE gateway 408 (e.g., by updating network data 412), as indicated at circle D. Furthermore, the PSE gateway 408 can update one or more of its route tables in route data 414 with the CIDR block associated with the IVN.

Another such interface 402 command allows a user to associate an attached IVN with an attached VIF at a PSE gateway. For example, the user can issue an "associate-PSE-gateway-route-table" command with a "PSE-gateway-route-table-id" parameter having a value corresponding to an identifier of the route table that corresponds to the VIF to which the IVN will be associated, an "IVN-identifier" parameter having a value that identifies the IVN to associate with the VIF, and a "VIF-identifier" parameter having a value that identifies the VIF to associate with the IVN. The control plane service 404 associated with the command issues one or more control plane operations to the PSE manager 410 to associate the IVN and VIF in the PSE gateway 408 (e.g., by updating network data 412), as indicated at circle D.

In at least some embodiments, the PSE gateway 408 can propagate routing information either to any attached IVNs or to any peered customer gateways attached via a VIF. For example, the PSE gateway can propagate a route for the PSE gateway to attached IVNs. Alternatively, the user can use the "create-route" command to manually add the PSE gateway to a route table for the subnet/IVN. As another example, the PSE gateway 408 can exchange routing information with a peered customer gateway. Alternatively, the user can use the "create-route" command to manually add routes to the routing table(s) of the PSE gateway 408.

Another such interface 402 command allows a user to setup peering (e.g., via the Border Gateway Protocol or BGP) between the PSE gateway 408 and connected customer gateways. For example, the user can issue an "create-bgp-peer" command with a "PSE-gateway-identifier" having a value identifying a PSE gateway (e.g., the PSE gateway 408) and a "VIF-identifier" parameter having a value that identifies the VIF connected to the customer gateway (e.g., VIF 418C for the customer gateway 496B). The control plane service 404 associated with the command issues one or more control plane operations to the PSE manager 410 to set up the peering with the PSE gateway 408 (e.g., by updating network data 412), as indicated at circle D.

Figure 5:
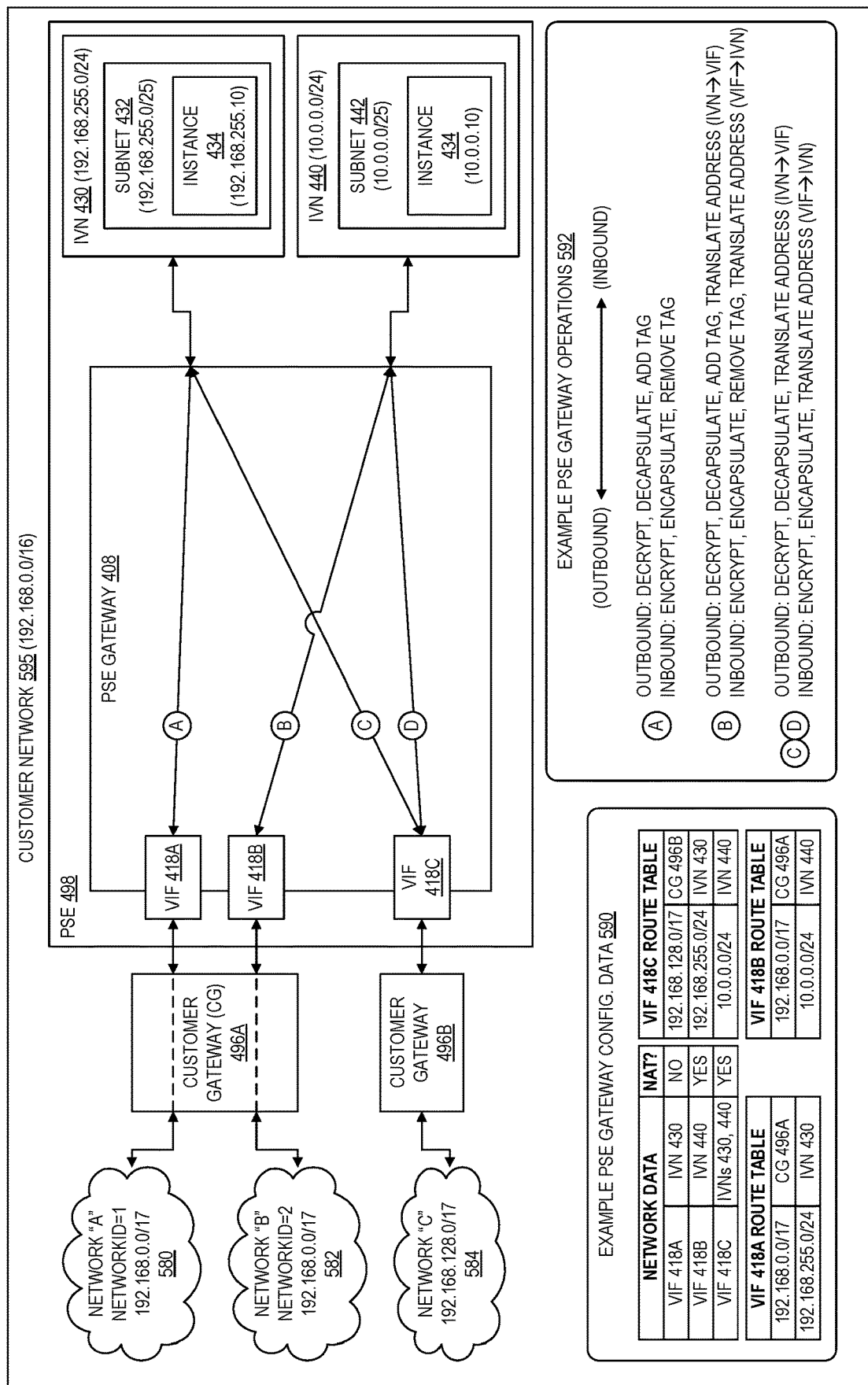
FIG. 5 is a block diagram illustrating an example provider substrate extension networking configuration with a network external to a provider network according to at least some embodiments.

FIG. 5 is a block diagram illustrating an example provider substrate extension networking configuration with a network external to a provider network according to at least some embodiments. In this example, the PSE gateway 408 routes traffic between VIFs 418A, 418B, and 418C and IVNs 430 and 440. VIFs 418A and 418B connect to the customer gateway 496A. The customer gateway 496A connects to a network "A" 580 of the customer network 595 and a network "B" 582 of the customer network 595. Of note, networks 580 and 582 have overlapping CIDR blocks and are differentiated using a network tag or identifier. VIF 418C connects to the customer gateway 496B. The customer gateway 496B connects to a network "C" 584 of the customer network 595. The example PSE gateway configuration data 590 includes network data (e.g., network data 412) that associates VIF 418A with IVN 430, VIF 418B with IVN 440, and VIF 418C with IVNs 430 and 440. These associations are illustrated within the PSE gateway 408. Note that NATing is enabled for VIFs 418B and 418C, although the NAT tables are not shown as various NATing techniques can be employed.

The example PSE gateway configuration data 590 includes routing tables (e.g., routing data 414) based on the routes either dynamically propagated or statically created for the various VIFs. For VIF 418A, traffic destined for the CIDR block 192.168.0.0/17 is routed to the customer gateway (CG) 496A and traffic destined for the CIDR block 192.168.255.0/24 is routed to the IVN 430. For VIF 418B, traffic destined for the CIDR block 192.168.0.0/17 is routed to the customer gateway 496A and traffic destined for the CIDR block 10.0.0.0/24 is routed to the IVN 440. For VIF 418C, traffic destined for the CIDR block 192.168.128.0/17 is routed to the customer gateway CG 496B, traffic destined for the CIDR block 192.168.255.0/24 is routed to the IVN 430, and traffic destined for the CIDR block 10.0.0.0/24 is routed to the IVN 440.

Note that if an IVN is associated with two VIFs associated with overlapping address ranges, the instance sending the packet could include an additional identifier to distinguish between the two VIFs. For example, the instance could specify the identifier when sending the packet, and the network manager (not shown) could include the identifier when encapsulating the packet to provide the PSE gateway a mechanism for distinguishing between the two VIFs.

The PSE gateway 408 performs various operations depending on the source and destination of traffic routed between the PSE 498 and the customer network 595. Example PSE gateway operations 592 summarize these operations for the routes corresponding to the circled letters A through D. As indicated in example 592, the term "inbound" refers to traffic with a source in the customer network 595 and a destination within the PSE 498, and the term "outbound" traffic refers to traffic with a source in the PSE 498 and a destination in the customer network 595. Note that these example operations 592 assume that outbound traffic received by the PSE gateway 408 includes IVN encryption, although that may not always be the case.

For outbound traffic over the network connection associated with circle A, the PSE gateway 408 decapsulates the packets (to remove SAD-based addressing), decrypts the encryption used for the IVN, and adds a tag to allow the customer gateway 496A to distinguish the traffic from traffic sent via VIF 418B. For inbound traffic over the network connection associated with circle A, the PSE gateway 408 encapsulates the packets (to add SAD-based addressing), encrypts the payload of the packet with the encryption used for the IVN, and removes any tag use to identify the network interface with the customer gateway 496A.

For outbound traffic over the network connection associated with circle B, the PSE gateway 408 decapsulates the packets (to remove SAD-based addressing), decrypts the encryption used for the IVN, and adds a tag to allow the customer gateway 496A to distinguish the traffic from traffic sent via VIF 418A. Additionally, since NATing is enabled for this VIF, the PSE gateway 408 translates the source address according to a NAT table.

For inbound traffic over the network connection associated with circle B, the PSE gateway 408 encapsulates the packets (to add SAD-based addressing), encrypts the payload of the packet with the encryption used for the IVN, and removes any tag use to identify the network interface with the customer gateway 496A. Additionally, since NATing is enabled for this VIF, the PSE gateway 408 translates the destination address according to a NAT table.

For outbound traffic over the network connection associated with circles C and D, the PSE gateway 408 the PSE gateway 408 decapsulates the packets (to remove SAD-based addressing), decrypts the encryption used for the IVN, and, since NATing is enabled for this VIF, translates the source address according to a NAT table.

For inbound traffic over the network connection associated with circles C and D, the PSE gateway 408 encapsulates the packets (to add SAD-based addressing), encrypts the payload of the packet with the encryption used for the IVN, and, since NATing is enabled for this VIF, translates the destination address according to a NAT table.

Note that in some embodiments, the network manager performing the encapsulation of traffic sent by an instance and destined for a customer gateway can avoid encrypting the packets, thereby removing the need for the PSE gateway to perform decryption operations on outbound traffic. Similarly, the PSE can avoid performing encryption operations on inbound traffic when the network manager for an instance does not perform decryption on traffic originating from a customer gateway.

Figure 6:
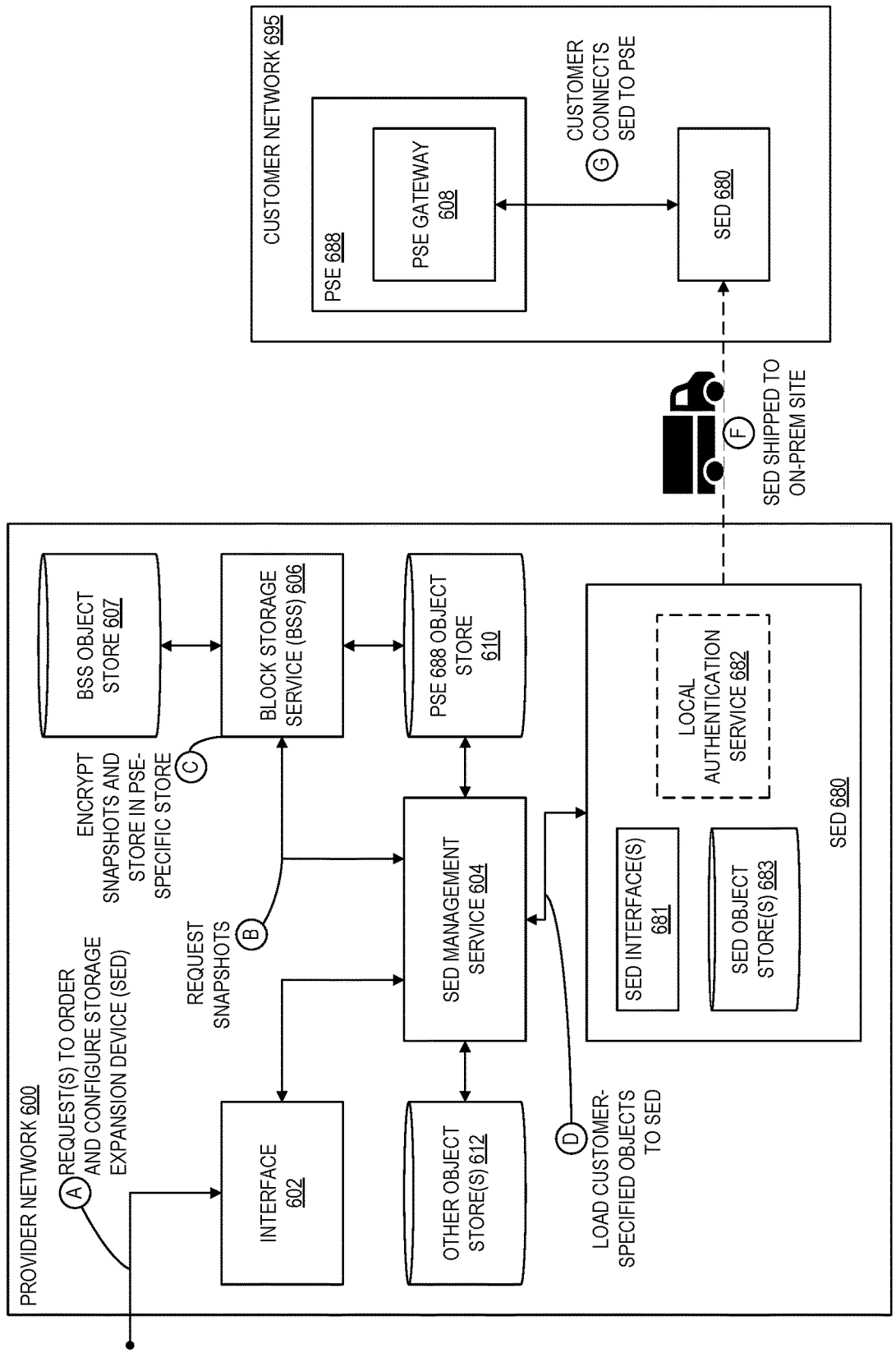
FIG. 6 is block diagram illustrating an example system environment for deploying a storage expansion device to a provider substrate extension according to at least some embodiments.

FIG. 6 is block diagram illustrating an example system environment for deploying a storage expansion device to a provider substrate extension according to at least some embodiments. A customer can order a storage expansion device (SED) to provide additional compute and storage resources to a PSE by way of one or more processors and memory (e.g., terabytes of storage). Preferably, the SED has a physical form that can be easily shipped (e.g., using courier services) from a data center of a provider network to the customer. One advantage of a SED is to provide secure data transfer that bypasses the connection between the provider network and the PSE. Such data may be organized into objects (sometimes referred to as files). Objects, like files, can include data such as graphical images, machine images, block storage volume backups, databases, etc. Objects can further include metadata (e.g., creation date, author, permissions, etc.) about the data. Objects can be organized into object stores, which may be considered a logical entity that stores objects on computer systems of the provider network substrate (e.g., like a directory in a file system). Object stores generally include an interface through which applications or services can write objects to the store or read objects from the data store. One such interface is an API that supports basic data transfer operations with commands such as GET/READ, PUT/WRITE, COPY, MOVE, etc.

As illustrated, a provider network 600 includes a SED management service 604. As will be described with reference to circles A through G, the SED management service 604 facilitates the secure transfer of data via a SED 680 from the provider network 600 to a PSE 688 deployed within a customer network 695. As indicated at circle A, an interface 602 receives one or more messages from a customer (or service) requesting to order and configure a SED. Such messages can include one or more parameters, such as hardware specifications for the SED (e.g., when multiple SED variants exist with different amounts of storage), an identification of any objects to be loaded to the SED prior to shipment, an indication of a shipment address, identification information of users permitted to access preloaded objects and their respective permissions (e.g., read-only, write, etc.), and/or a PSE identifier that identifies the PSE the customer intends to connect the SED to. In some embodiments, only a specific user or service account of the provider network is permitted to access data stored on the SED. The customer requesting the SED can include an additional parameter identifying that account.

The interface 602 may provide a console or API and be part of, or serve as a front-end to, control plane services that include "backend" services supporting and enabling the services and options offered to customers, including the SED management service 604. Based on the received requests and associated parameters, the interface 602 can send one or more messages to the SED management service 604 to load data to the SED.

In some embodiments, different objects may have different levels of encryption. For example, one application might encrypt data before storing it as an object in an object store of the provider network (e.g., client-side encryption) while another application or service might not, instead relying on the encryption of the objects and/or object stores by an object storage service of the provider network (e.g., server-side encryption). For example, snapshot objects generated by a block storage service (BSS) 606 and stored in a BSS object store 607 can include encryption applied by the BSS in addition to the encryption of objects stored in the BSS object store 607 by the object storage service. As used herein, a snapshot object is a backup of a block storage volume. Such volumes may be boot volumes (e.g., machine images that can be used to boot a virtual machine) or other volumes (for other block storage applications), for example.

To prevent the leakage of client-side encryption keys used within the provider network 600 to the PSE 688, the SED management service 604 can identify any objects identified in the customer-specified set of objects to preload to the SED and issue a request to the appropriate client application to re-encrypt object(s) using a key that can be exposed to the PSE, as indicated at circle B. In this example, the SED management service 604 sends a request to the BSS 606 to generate snapshots encrypted with keys that can be provided to the PSE. In this example, a per-PSE object repository stores objects that have their client-side encryption altered to be sent to a PSE. Based on the request from the SED management service 604, the BSS 606 reads the snapshots stored in the BSS object store 607, decrypts them using the associated client-side encryption keys that will remain isolated within the provider network 600, encrypts them using new client-side encryption keys that can be sent to the PSE 688, and stores the newly encrypted snapshots in the PSE object store 610 for PSE 688, as indicated at circle C.

If the data of an object with client-side encryption becomes altered or corrupted, upon decryption, the client application may be unable to determine the object was modified and attempt to use un-decrypted data. To avoid this situation, the application encrypting the object can apply a form of authentication with the encryption to both obfuscate the data and ensure its integrity. For example, the application can generate an authentication tag or hash and embed that value with the object metadata so that the client application can verify the object was not altered.

As indicated at circle D, the SED management service 604 loads the customer-specified objects to the SED 680. Such objects can include objects stored in other object store(s) 612 as well as those objects that had their client-side encryption modified and stored in the PSE object store 610, such as snapshots. As illustrated, the SED 680 includes SED interface(s) 681. SED interface(s) 681 allow the SED 680 to communicate in various settings (e.g., when connected to the provider network 600, when connected to a PSE). The SED interface(s) 681 can provide an API such as the interface described above for object stores, supporting operations such as GET and PUT. The loading of the customer-specified objects to the SED 680 can be carried out in a variety of ways. For example, the SED management service 604 can perform the GET and PUT (or COPY) operations. The SED management service 604 can, for each of the objects to load onto the SED 680, issue a read operation for the object to the source object store and an associated write operation to the SED 680 (or simply a copy operation that specifies both the source and destination object stores). As another example, the SED management service 604 can instantiate one or more workers via another control plane service that can carry out the data transfer operation.

In some embodiments, the SED 680 can provide a local authentication service 682. The local authentication service 682 can be used to authenticate instances attempting to access data stored in the SED 680 without relying on a remote authentication service (e.g., of the provider network). The local authentication service preferably has a different namespace from the authentication service used to verify object accesses in object stores of the provider network 600. In addition to preloading objects, the SED management service 604 can load the SED 680 with authentication data for users permitted to access various object stores 683. In some embodiments, attempts to access the object stores 683 can be permitted either with the local authentication service or the authentication service of the provider network 600. For example, when an instance hosted by a PSE connected to a SED attempts to access an object store 683, the request can first be authenticated with the authentication service of the provider network 600. If that authentication service is unreachable or otherwise unavailable, the request can be authenticated with the local authentication service.

In some embodiments, when a SED is provisioned, it can be assigned one or more encryption keys used to encrypt data on its storage devices. For example, a SED may employ block level encryption for each logical volume and object level encryption for each object store on those logical volumes, resulting in many different encryption keys. Since the nature of a SED means that it will be outside of the control of the provider network operator during its lifetime, these keys are preferably not persisted on the SED. Instead, the SED management service 604 can generate and encrypt a manifest file that includes the encryption keys for a given SED. In some embodiments, the SED management service 604 encrypts the manifest file using a combination of an unlock code and a key associated with a secure hardware component integrated into the SED (e.g., a trusted platform module or TPM). Note that the unlock code can be generated by the SED management service 604 in response to the customer's request for a SED. For example, the unlock code may be a randomly generated code, a hash of one or more identifiers such as an identifier of the SED and an identifier of the customer, etc.

While objects are being loaded by the SED management service 604, the SED 680 encrypts the objects using the one or more layers of encryption (e.g., a block level encryption and an object level encryption). In embodiments relying on an encrypted manifest that contains the encryption keys, the SED management service 604 can provide the SED 680 with the manifest and unlock key for use during the loading process. The SED 680 can decrypt the manifest to obtain the encryption keys and maintain both the manifest and the encryption keys in volatile memory rather so that upon powering down the SED 680, the manifest and unlock code are isolated from the SED 680 during transit.

As indicated at circle F, the provider network operator can ship (e.g., via a courier) the SED 680 to the desired location once the SED 680 has been loaded with the appropriate objects and additional configuration data (e.g., authentication data). The customer may explicitly identify that location in its original request for the SED or indirectly identify the location for the shipment by indicating to the provider network operator to ship the SED 680 to the same location of the associated PSE 688. The SED management service 604 may provide an alert or other indication (e.g., via a notification service of the provider network) to personnel responsible for shipping SED 680 when it is ready for shipment.

Upon receipt of the SED 680, the customer connects it to the PSE 688 as indicated at circle G. Various techniques for connecting the SED 680 to the PSE 688 are possible (e.g., such as by using a PSE gateway 608 (e.g., the PSE gateway 208, 408). For example, the customer can connect the SED 680 to their own network, either statically or dynamically assigning it an IP address. In such a scenario, the SED 680 would operate in a manner similar to the other customer resources 497 or a device on a customer subnet (e.g., networks 580, 582, 584). The customer can configure the PSE gateway 608 and a customer gateway (not shown) to route traffic between the PSE 688 and the SED 680 (e.g., using static or propagated routes in the gateways, associating IVNs with a VIF that routes to the SED 680, updating IVN route tables, etc. such as described above with reference to FIGS. 4 and 5).

As another example of connecting the SED 680 to the PSE 688, a PSE may include a switch having one or more dedicated network ports (sometimes referred to as private ports) that connect to the PSE gateway 608 for supported expansion devices such as a SED. Upon connection to one of these ports, a PSE framework (not shown) could statically or dynamically (e.g., via DHCP) assign the connected SED with an IP address and configure the PSE gateway 608 with a VIF having a SED-specific VLAN tag through which to route traffic between instances hosted by the PSE and the SED. The customer or service of the provider network could then update the PSE gateway 608 and/or the routing tables of IVNs to allow PSE-hosted instances to access the SED 680.

Note that in some embodiments, the customer may request an empty SED or a partially loaded SED that the customer can load with other customer data prior to connecting the SED to a PSE. For example, the interface 602 may provide the customer with the ability to retrieve the manifest and unlock key to allow the customer to transfer data to and from a SED independent of a PSE.

Figure 7:
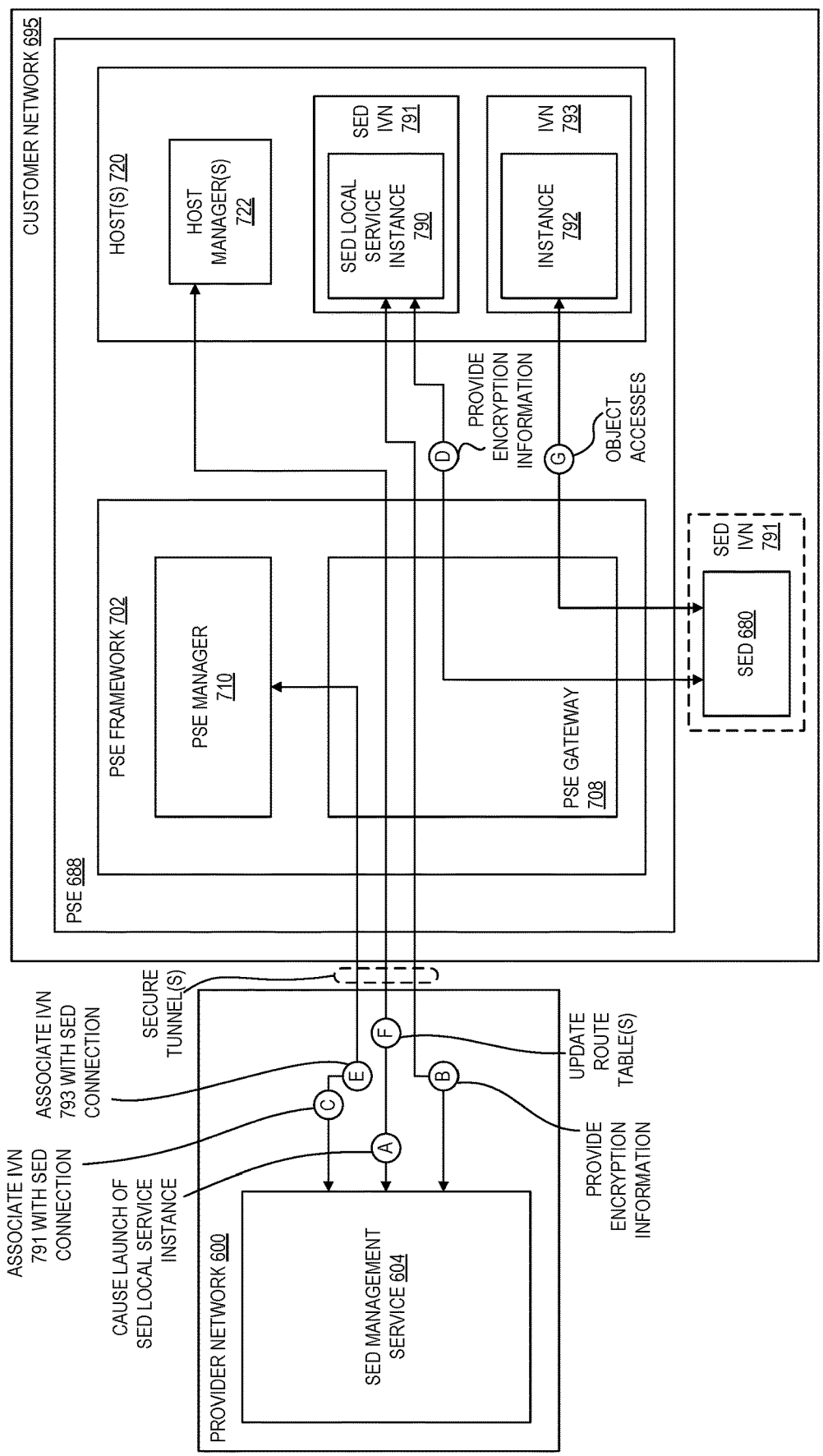
FIG. 7 is block diagram illustrating an example system environment for establishing communications between a storage expansion device and a provider substrate extension according to at least some embodiments.

FIG. 7 is block diagram illustrating an example system environment for establishing communications between a storage expansion device and a provider substrate extension according to at least some embodiments. As described above, one way of ensuring the security of data stored on an in-transit SED is to keep the encryption keys used to encrypt the stored data separate from the SED itself. To enable access to the stored data, a SED management service 604 can communicate with the PSE to enable access to the encrypted data on an attached SED in a process generally referred to as unlocking. As illustrated, the SED management service 604 of the provider network 600 is in communication with the PSE 688 of the customer network 695 via one or more secure tunnels, such as tunnels described with reference to FIGS. 1-3. As will be described with reference to circles A through G of FIG. 7, the SED management service 604 coordinates with components of the PSE 688 to unlock the SED 680 upon connection to the PSE 688.

The PSE 688 includes a PSE framework 702 that has a PSE manager 710 similar (e.g., the PSE framework 202 and the PSE manager 210). The PSE framework 702 further includes the PSE gateway 708 (e.g., the PSE gateway 208, 408, 608). The PSE 688 also includes one or more hosts 720 that include host manager(s) 722, similar to the hosts 220 and host managers 222 described herein, to facilitate the hosting of instances. As indicated at circle A, the SED management service 604 launches a SED local service instance 790 on the PSE 688 (e.g., using the PSE identifier provided via the interface 602). Note that the SED management service 604 would typically message an instance management service (not shown) to initiate the launch with the host manager 722 via, e.g., a secure control plane tunnel rather than directly issuing operations to the host manager 722 as illustrated.

The SED local service instance 790 acts as an interface through which the SED management service 604 can perform unlock operations. As indicated at circle B, the SED management service can send encryption information (e.g., an encrypted manifest and unlock code) to the SED local service instance 790, which can later be used to unlock the SED 680.

As indicated at circle C, the SED management service 604 can send one or more messages to the PSE manager 710 to configure the PSE gateway 708 to route communications between the SED 680 and an SED IVN 791 of the SED local service instance 790. In cases where a dedicated network port of the PSE 688 is used to connect the SED 680, the message(s) may be sent prior to the connection of the SED 680 to the PSE 688. Upon connection of the SED 680, the SED 680 may be treated as a device of the SED IVN 791. Various techniques can be used to detect the connection of the SED 680 to the PSE 688. For example, the SED 680 may be configured to automatically reach out to a name registered to the network address of the SED local service instance 790 via a DNS service of the PSE framework 702. As another example, a DHCP service of the PSE framework 702 may send a notification to the SED local service instance 790 upon assigning creating a lease for the network address assigned to the SED 680.

In cases where the SED 680 is connected to the PSE 688 via the customer's network, the message(s) to configure the PSE gateway 708 to route communications between the SED 680 and the SED IVN 791 may be deferred until after the customer has provided the IP address any additional routing information (e.g., creating a VIF on the PSE gateway 708 that is associated with a CIDR block that includes the IP address of the SED 680). For example, the customer can provide the assigned IP address of the SED 680 to the SED management service 604, and the can send a message to the host manager 722 to update the routing table associated with the SED IVN 791 with the IP address target of the SED 680 (e.g., as indicated at circle F).

As indicated at circle D, Once the PSE gateway 708 has been configured to bridge communications between the SED 680 and the SED local service instance 790, the SED local service instance 790 can provide the encryption information to the SED 680 to unlock it for use. Upon successfully unlocking the SED 680, the SED local service instance 790 can send a message to the to the SED management service 604 indicating the SED 680 is available (e.g., as a response to the message that includes the encryption information).

At indicated at circle E, the SED management service 604 can send one or more messages to the PSE manager 710 to route communications from other IVNs, such as an IVN 793, to the SED 680 (e.g., by associated the IVN with VIF of the SED 680 in the PSE gateway 708). Such messages may be sent based on the identification information of users permitted to access the SED 680 provided via the interface 602 as described with reference to FIG. 6. As indicated at circle G, PSE-hosted instances such as instance 792 can then access the object data stored on the SED 680 (e.g., via the API of the SED 680 that supports get and put operations).

Note that since IVN traffic (e.g., from the instance 792) is typically encapsulated, the SED 680 or the PSE gateway 708 may perform the requisite decapsulation and encapsulation of traffic received from and sent to instances.

Figure 8:
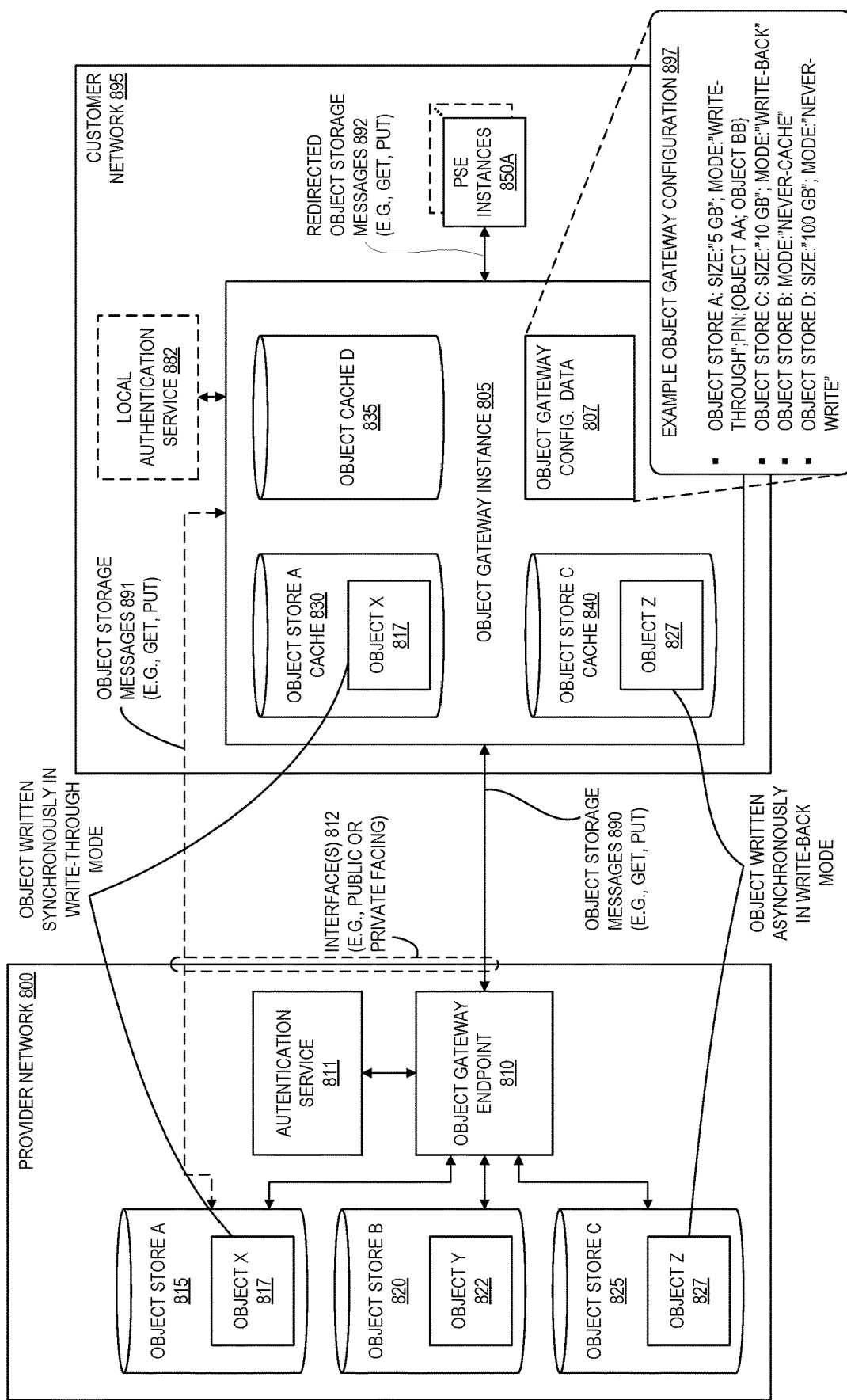
FIG. 8 is block diagram illustrating an example system environment that includes an object gateway for a provider substrate extension according to at least some embodiments.

FIG. 8 is block diagram illustrating an example system environment that includes an object gateway for a provider substrate extension according to at least some embodiments. At a high level, an object gateway is deployed locally within an on-prem site and has access to some amount of storage resources to cache data (e.g., objects) typically stored within the provider network, transparently providing PSE-hosted instances with quicker access to data as compared to the data being hosted in a remote data center of the provider network. The provider network includes an interface through which a customer can configure an object gateway, including which data is stored and how the data is exchanged with the storage of the provider network (if at all). The object gateway provides an API that supports at least some of the operations associated with object stores, such as object GET and PUT operations, that would typically be exercised by instances performing data accesses. For example, a PSE-hosted instance can attempt to read data from an object store (e.g., with an object GET operation), the read request is redirected to the object gateway, and the object gateway fulfills the request locally (if the data is cached) or from the provider network (if the data is not cached).

As illustrated in FIG. 8, a customer network 895 includes one or more PSE-hosted instances 850. The PSE-hosted instance(s) 850 issue object storage messages 892 (e.g., GET and PUT operations) to object stores of a provider network 800, which are intercepted by or otherwise redirected to an object gateway instance 805 before being sent to the provider network 800. For example, a PSE gateway (not shown) can redirect any object storage messages received from PSE-hosted instances 850 to the object gateway 805. As another example, a DNS service of the PSE framework (not shown) can resolve a domain name associated with an object storage service of the provider network to the IP address of the object gateway so that PSE-hosted instances 850 address their object storage messages 892 directly to the object gateway 805.

The object gateway 805 can include an interface to receive object storage messages 892 from PSE-hosted instances 850, such as an API that supports object GET and PUT operations. Exemplary messaging 892 can include messages via which the instance 850 attempting to access an object provides credentials to use to access the object, an identifier of an object store that contains an object, and an indication of the type of operation (e.g., GET or PUT). In the case of a GET operation, the messages can further include an identifier of the object. In the case of a PUT operation, the messages can further include the object data.

In the case of an object GET operation, the object gateway instance 805 can fulfill the operation by first checking whether the data is cached and, if not, obtaining it from an object store in a provider network 800 using an object GET operation. In the case of an object PUT operation, the object gateway instance can write the data to the cache and to an object store in the provider network 800 using an object PUT operation.

The object gateway 805 can include another interface to issue object storage messages to the provider network 800 to fetch un-cached objects on behalf of instances 850 and to store objects written by instances 850 to object stores of the provider network 800. The object gateway 805 can perform such object storage operations using various approaches. In one example approach described via messaging 890, the object gateway 805 can indirectly access object stores of the provider network 800 via an object gateway endpoint 810 (e.g., by sending messages to a provider network address associated with the object gateway endpoint 810). In another example approach described via messaging 891, the object gateway 805 can bypass the object gateway endpoint 810 and access object stores of the provider network 800 directly (e.g., by sending messages to a provider network address associated with the object stores). To facilitate communications with the object gateway instance 805, the provider network 800 includes one or more interfaces 812 that may be private-facing (e.g., such that object access operations are routed to the provider network 800 via a secure data plane tunnel between the PSE and the provider network 800) or public-facing (e.g., such that object access operations are routed to the provider network 800 via the internet).

Under either approach, messaging 890 and 891 can contain items such as object store identifiers, object identifiers, object data, etc. The approaches differ in how object storage operations involving object stores in the provider network are authenticated. Under the example approach using the object gateway endpoint 810, the object gateway instance 805 can submit the credentials provided by the PSE-hosted instance 850 in the object storage operation issued to the object gateway endpoint 810. Using the credentials, the object gateway endpoint 810 verifies the instance has permission to access the object store with an authentication service 811 of the provider network 800. If the operation is authorized, the object gateway endpoint 810 fulfills it from an object store of the provider network. Under the example approach bypassing the object gateway endpoint 810, the object gateway instance 805 can be provided with an access token that an object store of the provider network 800 can use to verify the origin of an object storage operation.

Accordingly, the object gateway instance 805 can submit an access token associated with a PSE-hosted instance 850 originating a request as part of the object storage operation sent via messaging 891 to an object store of the provider network 800. The recipient object store can perform the storage operation based on the validity of the access token.

The object gateway instance 805 can also authenticate object storage operations using the authentication service 811 and/or a local authentication service 882 (if present) before accessing object caches hosted by the object gateway instance 805. For example, prior to providing a cached object to a PSE-hosted instance 850, the object gateway instance 805 can send a request, including the instance-provided credentials, to the object gateway endpoint 810 to verify the instance has permission to access the object (or the object store containing the object). The object gateway endpoint 810 verifies the request by submitting the credentials to the authentication service 811. The authentication service 811 may apply the same set of permissions to cached data as to data stored within object stores of the provider network 800. For example, if the instance is permitted to access an object store hosted within the provider network 800, the instance is also permitted to access a cache of the object store hosted by the object gateway 805 within the customer network 895. The object gateway endpoint 810 responds to the object gateway 805 with an indication of whether the instance is permitted to access the cached object. As another example, prior to writing an object from a PSE-hosted instance 850 to local storage, the object gateway instance 805 can send a request, including the instance-provided credentials, to the local authentication service 882. The local authentication service 882 may be a software program hosted by an instance, a PSE framework, or even by a SED (e.g., the local authentication service 682).

The object gateway 805 may cache whether particular instances are permitted to access particular caches for some period of time (e.g., 0 minutes, 10 minutes, 1 day). If the instance is permitted to access the object, the object gateway 805 can provide the cached object to the instance.

Various configuration parameters can be set for an object gateway. Such parameters can include an identification of object stores of the provider network 800 to cache, the timing of when data should be written to the cache relative to the provider network, caching policies, cache sizes, whether any objects should be excluded from eviction (e.g., "pinned" in the cache), whether and how long authentication responses are cached, whether to create any storage for storing objects not stored by the provider network, etc. Additional parameters can include performance parameters for the object gateway such as input/output operations per second (TOPS), disk or storage bandwidth, network bandwidth, etc. The configuration parameters can be stored in object gateway configuration data 807, which is received or otherwise obtained through object gateway management services of the provider network as will be described with reference to FIG. 9.

An example object gateway configuration 897 will be described with respect to the illustrated system. As shown, the provider network includes three object stores: an object store A 815 that includes (or will be the target of a PUT operation for) an object X 817, an object store B 820 that includes (or will be the target of a PUT operation for) an object Y 822, and an object store C 825 that includes (or will be the target of a PUT operation for) an object Z 827.

The example object gateway configuration 897 indicates that the object gateway 805 is to provide a 5 gigabyte (GB) cache for object store A 815, illustrated as object store A cache 830. The object gateway configuration 897 further includes a list of objects to pin to the cache for object store A 815 that will be exempt from any cache eviction policy. Here, the list includes objects AA and BB (not shown within the cache 830). The object gateway configuration 897 further includes a "write-through" data transfer mode for objects written to object store A cache 830. Under the write-through mode, objects written to a cache are synchronously written to the associated object store of the provider network. Thus, for a write operation of object X by a PSE-hosted instance 850, the object gateway 805 will synchronously write object X to the object store A cache 830 and to the object store A 815. For a read operation of object X by a PSE-hosted instance 850, the object gateway 805 will first check the object store A cache 830. If object X is present in the cache, the object gateway 805 will fulfill the read operation from the object store A cache 830 (assuming the credentials are verified). Otherwise, the object gateway 805 will fetch the object from the object store A 815, cache the object in the object store A cache 830, and send the object to the requesting instance 850.

The example object gateway configuration 897 indicates that the object gateway 805 is to provide a 10 GB cache for object store C 825, illustrated as object store C cache 840. The object gateway configuration 897 further includes a "write-back" data transfer mode for objects written to object store C cache 840. Under the write-back mode, objects written to a cache are asynchronously written to the associated object store of the provider network. Thus, for a write operation of object Z by a PSE-hosted instance 850, the object gateway 805 will first write object Z to the object store C cache 840 and, sometime later, write object Z to the object store C 825. For a read operation of object Z by a PSE-hosted instance 850, the object gateway 805 will first check the object store C cache 840. If object Z is present in the cache, the object gateway 805 will fulfill the read operation from the object store C cache 840 (assuming the credentials are verified). Otherwise, the object gateway 805 will fetch the object from the object store C 825, cache the object in the object store C cache 840, and send the object to the requesting instance 850.

The example object gateway configuration 897 indicates that the object gateway 805 is to operate in a "never-cache" mode for objects stored in the object store B 820. Under the never-cache mode, the object gateway 805 does not cache data written to or read from the object store B 820, acting as a relay or proxy to the object store B 820. Thus, for a write operation of object Y, the object gateway 805 writes the object to the object store B 820 without caching. And for a read operation of object Y, the object gateway 805 reads the object from the object store B 820.

The example object gateway configuration 897 indicates that the object gateway 805 is to provide a 100 GB, locally-hosted object cache, illustrated as object store D 835, to serve as a local object store. Such a locally hosted data cache can be achieved by creating a cache in a "never-write" data transfer mode. Thus, writes to the object store D 835 are not propagated to an object store the provider network. Authentication of requests to access object store D 835 can be provided by the authentication service 811 or via the local authentication service 882.

The caches 830, 840 and local object store 835 can be implemented using local storage resources (e.g., solid-state drives, hard disk drives, etc.) available to the object gateway instance. Given those storage resources are finite, the object gateway instance 805 can employ various caching policies to control the fill and eviction of data that would be familiar to those skilled in the art (e.g., first in first out, lease recently used, etc.). The caching policies may be per-cache (e.g., a write to one cache will not cause an eviction in another cache), to groups of caches (e.g., a write to one cache may cause an eviction in another, grouped cache), or globally across the available storage of the object gateway 805 (e.g., a write to one cache can cause an eviction in any other cache).

Various implementations of the object gateway instance 805 may serve a single customer (e.g., the customer that ordered the PSE, another service of the provider network such as a block storage service) or multiple customers (e.g., the customer that ordered the PSE as well as other users that that customer has permitted to launch instances using the PSE). In the former case, additional object gateway instances (not shown) may be hosted locally within the customer network 895 to provide object caching facilities for each customer.

Regarding scaling, although the object gateway instance 605 illustrated here and in the other figures is shown as a single instance, in some embodiments, the object gateway is implemented as a cluster of instances (or nodes). For example, the customer may specify performance specifications for the object gateway that exceed the performance of a single instance. Messaging 892 can be load balanced across the nodes by. For example, another PSE-hosted instance can receive messaging 892 (e.g., object GET and PUT operations) at a network address. The instance can then distribute those operations across the nodes. As another example, a DNS service of the PSE (e.g., as part of the PSE framework) can randomly resolve name resolution requests to a group of network addresses of the nodes of the cluster. When a given node has to write data to cache (e.g., either as part of caching an object fetched from the provider network or in response to a write by another PSE-hosted instance), the node can distribute the object data across each of the other nodes in a cluster and update a distributed data store or index that maps which nodes store which portions of the object data. When a given node has to read data from cache (e.g., either as part of serving a cached object in response to a read by another PSE-hosted instance or evicting an object to an object store of the provider network), the node can access the distributed data store to identify the locations of the object data, request the object data from the corresponding nodes, and send the object to the appropriate destination. an object gateway may be implemented as a cluster of instances. Members of the cluster may be launched using redundant compute and storage hardware to mitigate a loss in availability or data in the event of a hardware failure.

Figure 9:
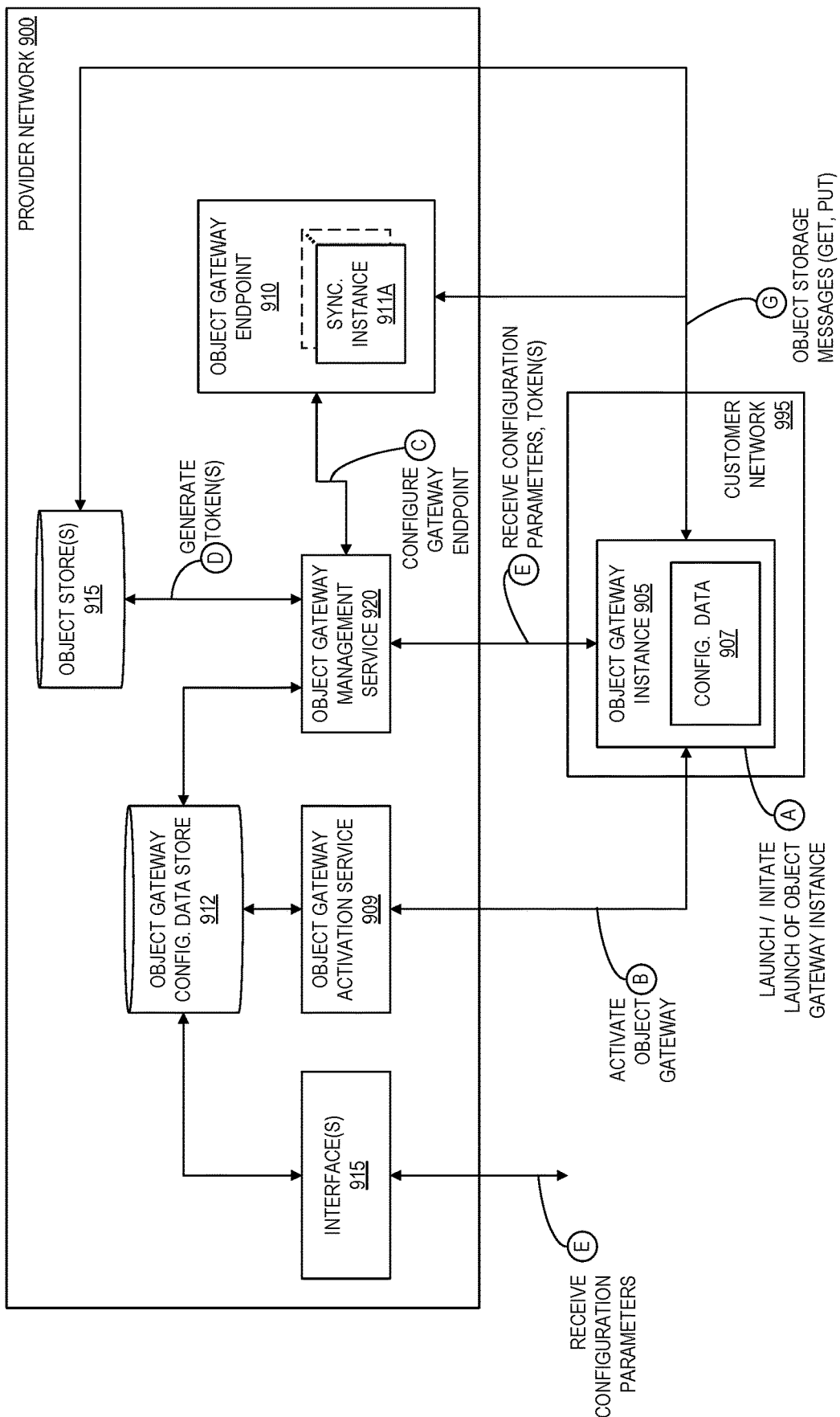
FIG. 9 is block diagram illustrating an example system environment for managing object gateways according to at least some embodiments.

FIG. 9 is block diagram illustrating an example system environment for managing object gateways according to at least some embodiments. As illustrated, a provider network 900 includes an object gateway activation service 909, an object gateway configuration data store 912, one or more interface(s) 915 (e.g., an API, a console, etc.), and an object gateway management service 920. A customer network 995 includes an object gateway instance 905.

As indicated at circle A, the object gateway instance 905 is launched within the customer network 995. In some scenarios, the customer may launch the object gateway instance 905 directly. For example, the customer may obtain an object gateway machine image that the customer can use to launch a virtual machine on a customer-owned server or instruct an instance management service of the provider network to launch an instance on the PSE using the object gateway machine image. In such cases, the customer would manage the object gateway instance 905, including performing operations such as restarting the object gateway instance 905 should it become unresponsive. In other scenarios, the customer may launch the object gateway instance 905 indirectly. For example, the customer may issue a command via the interface(s) 915 which in turn causes the launch of the object gateway instance 905 (e.g., via an instance management service (not shown) of the provider network) using the resources of the PSE or a SED. A service of the provider network such as the object gateway management service 920 would then manage the object gateway instance itself while the customer managed the various configuration parameters available to the object gateway instance.

In scenarios where the object gateway instance is not customer managed, the object gateway management service 920 can monitor and attempt to recover from failures of an object gateway instance. The object gateway management service 920 may periodically poll the object gateway instance 905 or expect periodic status messages from the object gateway instance 905 in order to determine the health of the instance. If the object gateway management service 920 detects an issue with the object gateway instance 905 (e.g., it is non-responsive), the object gateway management service 920 can restart the object gateway instance 905.

As indicated at circle B, the launched object gateway instance 905 can communicate with the object gateway activation service 909 to activate the object gateway. Such an activation process may be required in scenarios where the object gateway instance launches with a generic configuration that does not include any customer-specific credentials for communicating with the provider network 900. In an exemplary activation process, once the object gateway instance 905 has launched, it will reach out to the object gateway activation service 909 to negotiate an activation code that the customer can retrieve from the object gateway instance 905. The customer can then activate the object gateway instance 905 by submitting the activation code along with their credentials to the provider network 900 (e.g., to the object gateway activation service 909 or to the interface(s) 915) which will in turn associate the object gateway instance with the customer's account in the object gateway configuration data store 912. The object gateway configuration data store 912 can be a database or other data store that stores information about the object gateways including their respective associations with customer accounts, configuration parameters, etc. Note that in some embodiments, a customer-specific machine image that includes customer-specific credentials may be used to launch an object gateway instance thereby avoiding an activation process.

As indicated at circle C, the object gateway management service 920 can launch and/or configure an object gateway endpoint 910 for a newly launched object gateway instance 905 based on object gateway instances 905 identified in the object gateway configuration data store 912. The object gateway endpoint 910 can provide an interface via which an object gateway instance can perform object storage operations such as a PUT operation to write an object to an object store resident in the provider network and a GET operation to read an object from an object store resident in the provider network. In some embodiments, the object gateway endpoint 910 bridges secure sessions (e.g., TLS sessions) between the object gateway endpoint 910 and the object stores of the provider network 900 and between the object gateway endpoint 910 and the object gateway instance 905. Similar to the TLS-bridging of a PSE SAD proxy, the bridging by the object gateway endpoint 910 prevents sensitive information such as certificates from leaving the provider network 900.

In some embodiments, an object gateway endpoint 910 is a cluster of one or more synchronization instances 911A. The object gateway instance 905 can communicate with synchronization instances 911 of the cluster using an optimized data transfer protocol that can allow for high-speed data transfer of object data, including, in some cases, the ability to resume interrupted data transfers. Another service of the provider network may scale up or down the number of members of the cluster depending on the workload imposed by the object gateway instance 905. For example, the service may launch a cluster member for each object store in the provider network being accessed to allow parallel object storage or retrieval operations and terminate those cluster members when the access completes.

As indicated at circle D, the object gateway management service 920 can also negotiate an access token that the object gateway instance 905 can use to access object store(s) 915 while bypassing the object gateway endpoint 910. Object store(s) 915 can generate such tokens based on the credentials of any users permitted to access the object store(s) 915. Typically, such tokens have a temporary nature—they expire after some amount of time.

As indicated at circle E, the interface(s) 915 receives configuration parameters for the object gateway. For example, the interface 915 may include an API to which the customer can issue commands or a console-based interface. The interaction can include an identifier associated with the object gateway and various parameters such as those described herein, including which object stores of the provider network 900 to cache, whether to create any local only (e.g., never-write) object caches, the timing of when data should be written to the cache relative to the provider network (e.g., write-through mode, write-back mode, never cache, etc.), caching policies, cache sizes, whether and how long authentication responses are cached, etc. Additionally, the interface 915 can provide object-level commands through which the customer can obtain a list of objects currently stored in the cache(s), exclude certain objects from eviction (e.g., "pinning" them to the cache), force the eviction of certain objects from the cache, etc. The interface 915 updates the configuration for the specified object gateway instance in the object gateway configuration data store 912.

As indicated at circle F, the object gateway instance 905 receives customer-specified configuration parameters stored in the object gateway configuration data store 912 via the object gateway management service 920. Additionally, if the object gateway instance 905 accesses object store(s) 915 without an endpoint 910, the object gateway instance 905 can receive the access tokens generated between the object gateway management service 920 and the object store(s) 915. In some embodiments, the object gateway management service 920 will push updates to the object gateway instance 905, while in other embodiments, the object gateway instance 905 can request updates object gateway management service 920. Upon receiving the configuration parameters, the object gateway instance 905 updates its configuration data 907.

As indicated at circle G, the object gateway instance 907 can issue object storage operations with the object gateway endpoint 910 or with object store(s) 915 such as described for messages 890, 891. In some embodiments, when the updated configuration parameters include pinned objects that are not already cached, the object gateway instance 907 can immediately begin pre-fetching those objects from their respective object stores in the provider network without an explicit request from a PSE-hosted instance, thereby reducing the delay when such a request does arrive.

Figure 10:
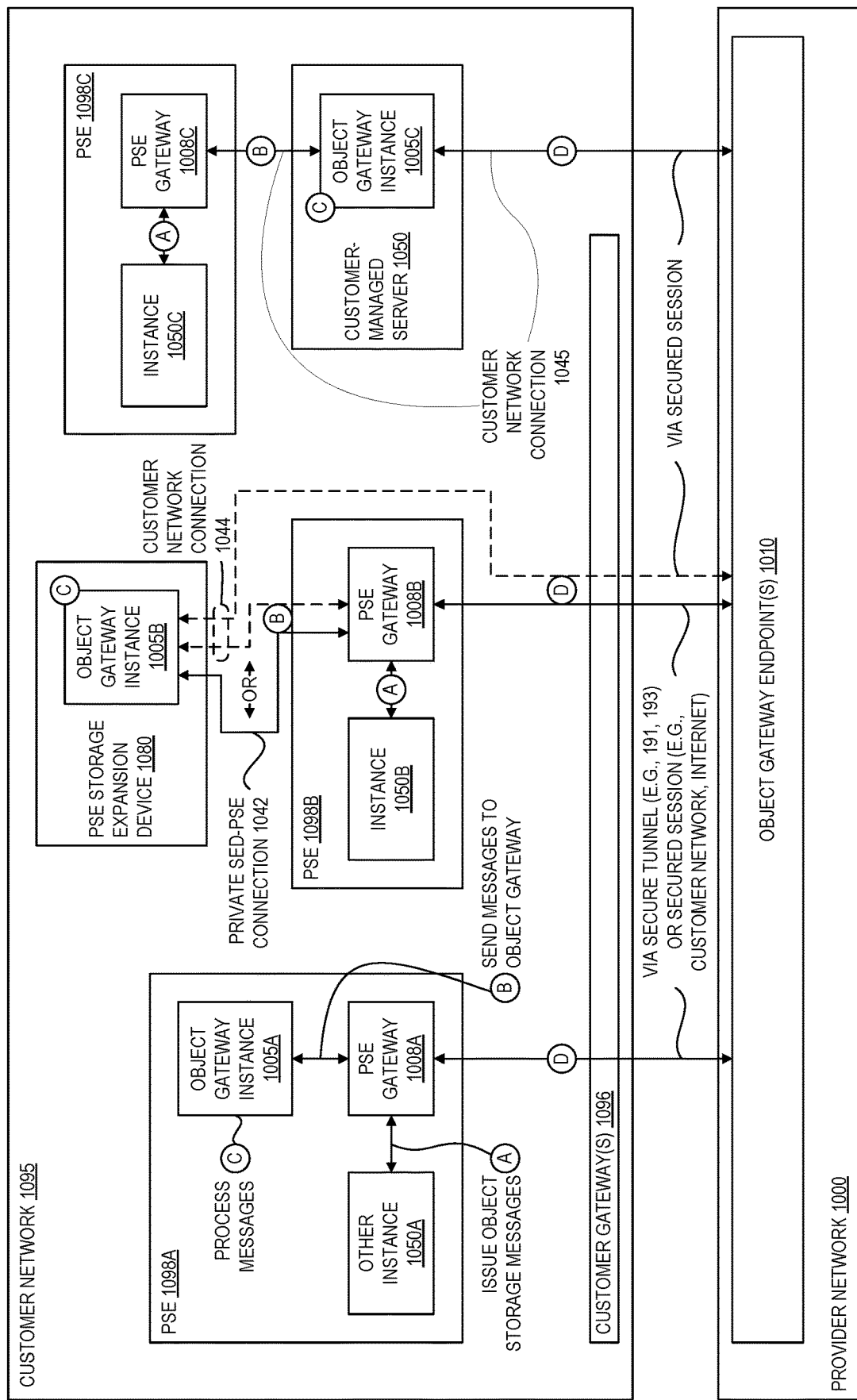
FIG. 10 is a block diagram illustrating exemplary deployments of object gateways for provider substrate extensions according to at least some embodiments.

FIG. 10 is a block diagram illustrating exemplary deployments of object gateways for provider substrate extensions according to at least some embodiments. To provide flexibility to the customer, an object gateway can be launched as an instance using various available on-prem resources. For example, one customer might want to preserve the available storage resources of the PSE for other tasks and allocate resources of customer-owned servers to host an object gateway. Another customer might want to leverage the resources of a PSE or a SED, if available, to host an object gateway. Accordingly, an object gateway can be distributed as a machine image that can be used to launch an object gateway instance in the desired environment. The deployment examples of FIG. 10 illustrate some of the ways in which an object gateway can be hosted within a customer network 1095 and communicate with an object gateway endpoint 1010 of a provider network 1000.

In a first deployment example, a PSE 1098A is host to an object gateway instance 1005A and another instance 1050A. A PSE gateway 1008A, as described herein, facilitates communications between the object gateway instance 1005A and the other instance 1050A. As indicated at circle A, the other instance 1050A issues object storage messages. For example, the other instance 1050A can issue an object GET message or an object PUT message that includes an object store identifier of an object store (not shown) of the provider network 1000. As indicated at circle B, such messages are sent or otherwise redirected to the object gateway instance 1005A by the PSE gateway 1008A. Various techniques can be employed to facilitate sending object storage operations originating from the other instance 1050A to the object gateway 1005A. For example, a routing table associated with the IVN within which the instance sending the request can be updated to include a route directing traffic to an object store of the provider network to the object gateway. As another example, a DNS of a PSE framework can redirect resolution requests originating from the other instance 1050A for a domain associated with the object stores in the provider network 1000 to an address associated with the object gateway 1005A. As yet another example, the PSE gateway 1008A can determine whether traffic addressed to a SAD of the provider network includes an object storage operation and, if so, redirect such traffic to the object gateway 1005A (e.g., using packet inspection techniques). Note that if the other instance 1050A and the object gateway instance 1005A are hosted by the same host (e.g., a host 220), the communications may be redirected via a network manager (e.g., the network manager 224) of the host rather than traverse through the PSE gateway 1008A. As indicated at circle C, the object gateway 1005A processes the object storage messages such as described with reference to FIG. 8. In the event that processing the messages requires the object gateway 1005A to access an object store in the provider network 1000, the object gateway 1005A can issue one or more messages to an object gateway endpoint 1010 via the PSE gateway 1008A, as indicated at circle D. If the object gateway endpoint 1010 includes a public-facing interface, the gateway-to-endpoint messages may be routed using a secure session (e.g., using TLS) via a customer gateway 1096 and third-party network(s) (e.g., the customer network 1095, the internet). If the object gateway endpoint 1010 includes a public-facing interface, the gateway-to-endpoint messages may be routed via one or more secure tunnels (e.g., via tunnel 191 or tunnel 193) and optionally with additional session encryption.

In a second deployment example, a PSE 1098B is host to an instance 1050B, and a PSE SED 1080 is host to an object gateway instance 1005B, preserving resource capacity of the PSE for other instances. In such a case, the customer can leverage the ability to pre-load objects to a SED for the object gateway instance 1005B. As described herein, a customer has various options for connecting a SED to a PSE. In some embodiments, the SED is connected to the PSE via a private connection 1042 (e.g., by connecting the SED to the PSE via a private port on a switch of the PSE). In other embodiments, the SED is connected to the customer network and communications are routed between the PSE and the SED by way of a PSE gateway 1008B and a customer gateway (not shown) over a customer network connection 1044 (e.g., similar to the connectivity of other customer resources 497C). In the case a PSE-to-SED connection via the private connection 1042, the message traffic flows similar to that described above with reference to circles A through D for the first deployment example. The instance 1050B issues object messages (circle A), those messages are sent to the object gateway instance 1005B via the PSE gateway 1008B and private connection 1042 (circle B, solid line) where the object gateway instance 1005 processes them (circle C). In the event that processing the messages requires the object gateway 1005B to access an object store in the provider network 1000, the object gateway 1005A can issue one or more messages to an object gateway endpoint 1010 via the PSE gateway 1008B and private connection 1042 (circle D, solid line). In the case a PSE-to-SED connection via the customer network connection 1044, the instance 1050B issues object messages (circle A), those messages are sent to the object gateway instance 1005B via the PSE gateway 1008B and customer network connection 1044 (circle B, dashed line) where the object gateway instance 1005 processes them (circle C). In the event that processing the messages requires the object gateway 1005B to access an object store in the provider network 1000, the object gateway 1005A can issue one or more messages to an object gateway endpoint 1010 via the customer network connection 1044 (circle D, dashed line). Note that such communications do not pass through the PSE gateway 1008B and thus do not traverse one of the secure tunnels established between the PSE gateway and the networking components of the provider network 1000 described elsewhere herein.

In a third deployment example, a PSE 1098C is host to an instance 1050C, and a customer-managed server 1050 is host to an object gateway instance 1005C, again preserving resource capacity of the PSE for other instances. The instance 1050C issues object messages (circle A), those messages are sent to the object gateway instance 1005C via the PSE gateway 1008C and customer network connection(s) 1045 where the object gateway instance 1005 processes them (circle C). In the event that processing the messages requires the object gateway 1005C to access an object store in the provider network 1000, the object gateway 1005A can issue one or more messages to an object gateway endpoint 1010 via the customer network connection(s) 1045 (circle D). Note that such communications do not pass through the PSE gateway 1008C and thus do not traverse one of the secure tunnels established between the PSE gateway and the networking components of the provider network 1000 described elsewhere herein.

In each of the deployment examples, if the object gateway instance 1005 fails to respond, the PSE gateway 1008 can cease rerouting messages received from the instance 1050 to the object gateway 1005 and instead route them to the object gateway endpoint 1010.

Figure 11:
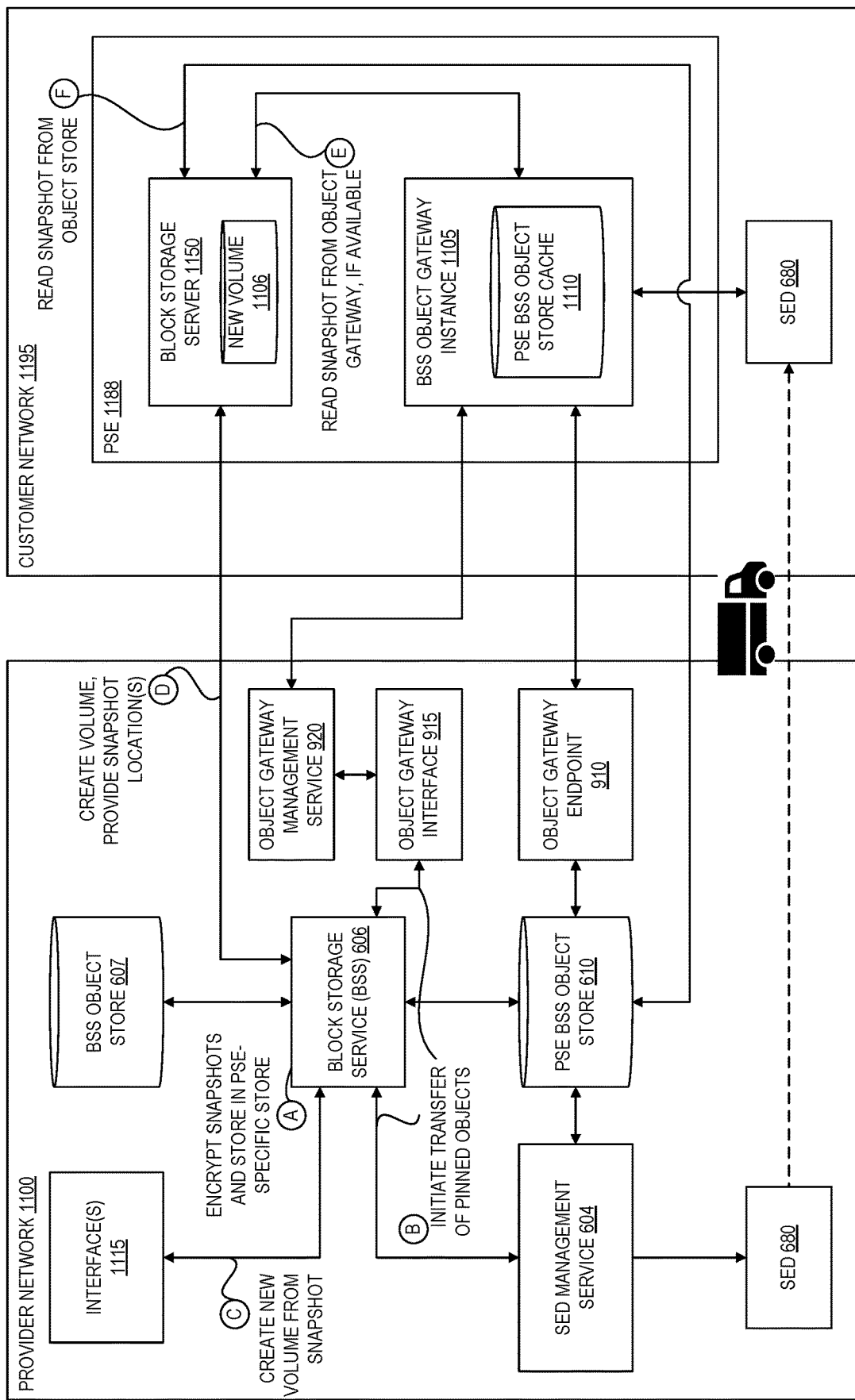
FIG. 11 is a block diagram illustrating an example system environment for deploying an object gateway for a block storage service of a provider network according to at least some embodiments.

FIG. 11 is a block diagram illustrating an example system environment for deploying an object gateway for a block storage service of a provider network according to at least some embodiments. In general, the customer of the object gateway services described herein is not limited to the customer associated with the PSE. Other services of the provider network that can be deployed within a PSE can leverage an object gateway to reduce their data access latency. One such service is a block storage service 606 that can be used to, inter alia, provide block storage volumes to instances (e.g., as a boot volume, as an attached storage volume, etc.) of a PSE. In the illustrated example, the BSS 606 of a provider network 1100 has launched an BSS object gateway instance 1105 on a PSE 1188 of a customer network 1195 (e.g., via an instance management service). As indicated at circle A and described with reference to FIG. 6, the BSS 606 can re-encrypt volume snapshots stored in the BSS object store 607 with a new key and stores the re-encrypted volume snapshots in the PSE BSS object store 610, avoiding the need to send the original encryption keys outside of the provider network 1100. The BSS object gateway instance 1105 includes a PSE BSS object store cache 1110 that can serve as an on-prem object cache for snapshots in the PSE BSS object store 610. In some embodiments, the PSE BSS object store cache 1110 is configured in a "write-through" mode to provide a consistent view of snapshots taken from the PSE within the provider network 1100.

A BSS customer (not shown) may have indicated to the BSS 606 that certain snapshots are to be pinned to the BSS object gateway instance 1105. As indicated at circle B, the BSS 606 can pre-load such snapshots via a SED (as described with reference to FIG. 6). For example, the BSS 606 can identify a list of snapshots in the PSE BSS object store 610 to the SED management service 604. The SED management service 604 can load the snapshots to a SED 680 that can be shipped to the on-prem site for connection to the PSE 1188. Also as indicated at circle B, the BSS 606 can pre-load snapshots via an update to the configuration of the BSS object gateway instance 1105 via the object gateway interface 915. For example, the BSS 606 can update the "pin" list configuration to include snapshots stored in the PSE BSS object store 610 via the object gateway interface 915. The object gateway interface 915 can update an object gateway configuration data store (not shown). The BSS object gateway instance 1105 can then receive the updated configuration from the object gateway configuration data store via the object gateway management service 920.

As indicated at circle C, an interface 1115 can send one or more customer-initiated messages (e.g., via a console or API of the interface 1115) to the BSS 606 to create a new volume from a snapshot. As indicated at circle D, the BSS 606 can send a message to a block storage server 1150 to cause it to create a new volume. Additionally, the block storage server 1150 can request or otherwise obtain a list of locations of the snapshot to be used to create the volume. For example, the BSS 606 can send the block storage server 1150 a list of locations that store the snapshot, including the PSE BSS object store cache 1110 and the PSE BSS object store 610. As indicated at circle E, the block storage server 1150 can request the snapshot from the PSE BSS object store cache 1110. If the snapshot has been preloaded, the PSE BSS object store cache 1110 can provide it to the block storage server 1150. If not, the PSE BSS object store cache 1110 can obtain the snapshot from the PSE BSS object store 610 via the object gateway endpoint 910 and provide it to the block storage server 1150. In some embodiments, if the snapshot has not been loaded to the PSE BSS object store cache 1110, the block storage server 1150 can request it from the PSE BSS object store 610 directly, as indicated at circle F. In either case, the block storage server 1110 can create a new volume 1106 from the snapshot.

As mentioned, in some embodiments the PSE BSS object store cache 1110 is configured in a write-through mode. Operating in a write-through mode, the customer can seamlessly create snapshots from volumes of block storage servers hosted by a PSE and store them within the provider network. In particular, the customer may instruct the BSS 606 to take a snapshot of the new volume 1106 after its contents have been modified. The block storage service 606 will send a message to the block storage server 1150 to cause it to create a snapshot of the new volume 1106 and write it to the PSE BSS object store 610 via the PSE BSS object store cache 1110 in write-through mode. Additionally, the BSS 606 can then decrypt the new snapshot with the PSE-specific key and re-encrypt it with the encryption key used within the provider network to store the snapshot in the BSS object store 607 (e.g., to reverse the client-side encryption process described above).

Figure 12:
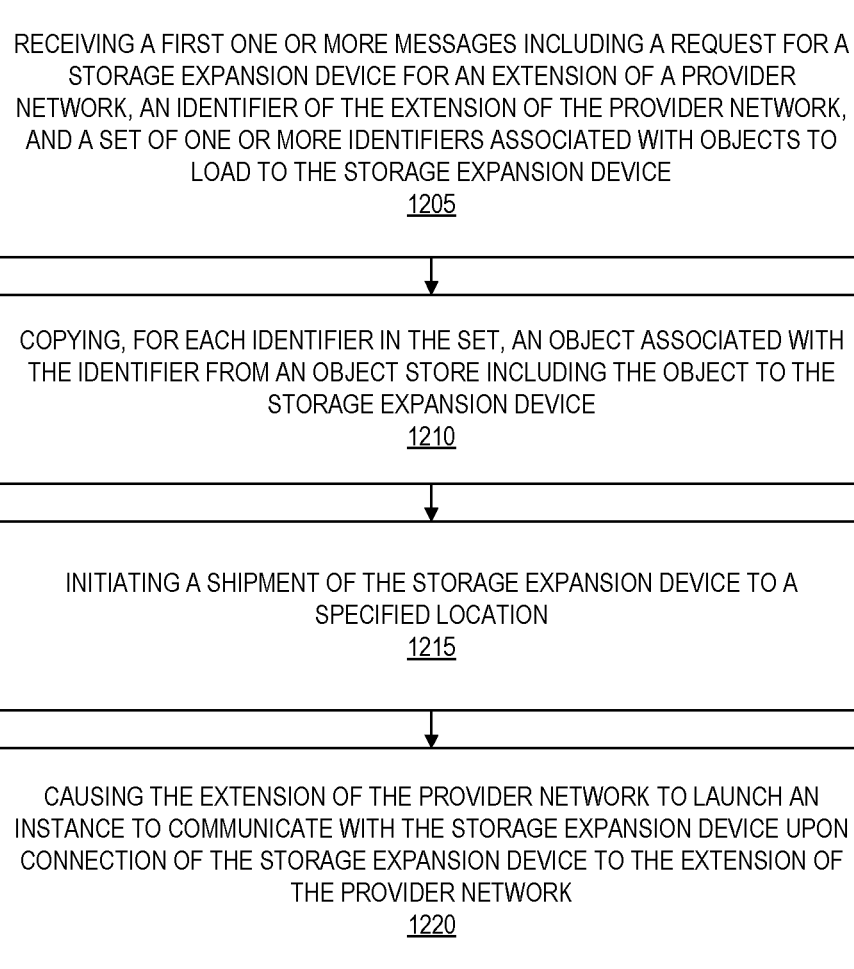
FIG. 12 is a flow diagram illustrating operations of a method for deploying a storage expansion device for a provider substrate extension according to at least some embodiments.

FIG. 12 is a flow diagram illustrating operations of a method for deploying a storage expansion device for a provider substrate extension according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of a provider network, such as services executed by computer systems located within a data center of the provider network. The provider network may be a cloud provider network. The one or more components of the provider network communicate with an extension of the provider network. The extension of the provider network includes one or more physical computing devices or systems and is remotely located from a data center (e.g., outside of the data center network) of the provider network, such as on the premises of a customer of the provider network. For example, in some embodiments, one or more (or all) of the operations are performed by components of the provider network (e.g., the SED management service 604) of the other figures.

The operations include, at block 1205, receiving a first one or more messages including a request for a storage expansion device for an extension of a provider network, an identifier of the extension of the provider network, and a set of one or more identifiers associated with objects to load to the storage expansion device. As described herein, an interface such as an API or console can be used to request a SED for a particular PSE. Various parameters can be specified with the request, including an identification of objects to preload on the SED before shipment.

The operations further include, at block 1210, copying, for each identifier in the set, an object associated with the identifier from an object store including the object to the storage expansion device. As described herein, a SED management service 604 can handle the loading of identified objects to the SED.

The operations further include, at block 1215, initiating a shipment of the storage expansion device to a specified location. As described herein, the SED management service 604 can send or initiate the sending of one or more notifications to indicate the SED is ready for shipment. For example, the SED management service 604 can send a notification when the loading of objects is complete.

The operations further include, at block 1220, causing the extension of the provider network to launch an instance to communicate with the storage expansion device upon connection of the storage expansion device to the extension of the provider network. As described herein, the SED management service 604 can cause the launch of a SED local service instance on the identified PSE, which in turn can be used to facilitate the unlocking of the SED by the PSE.

Figure 13:
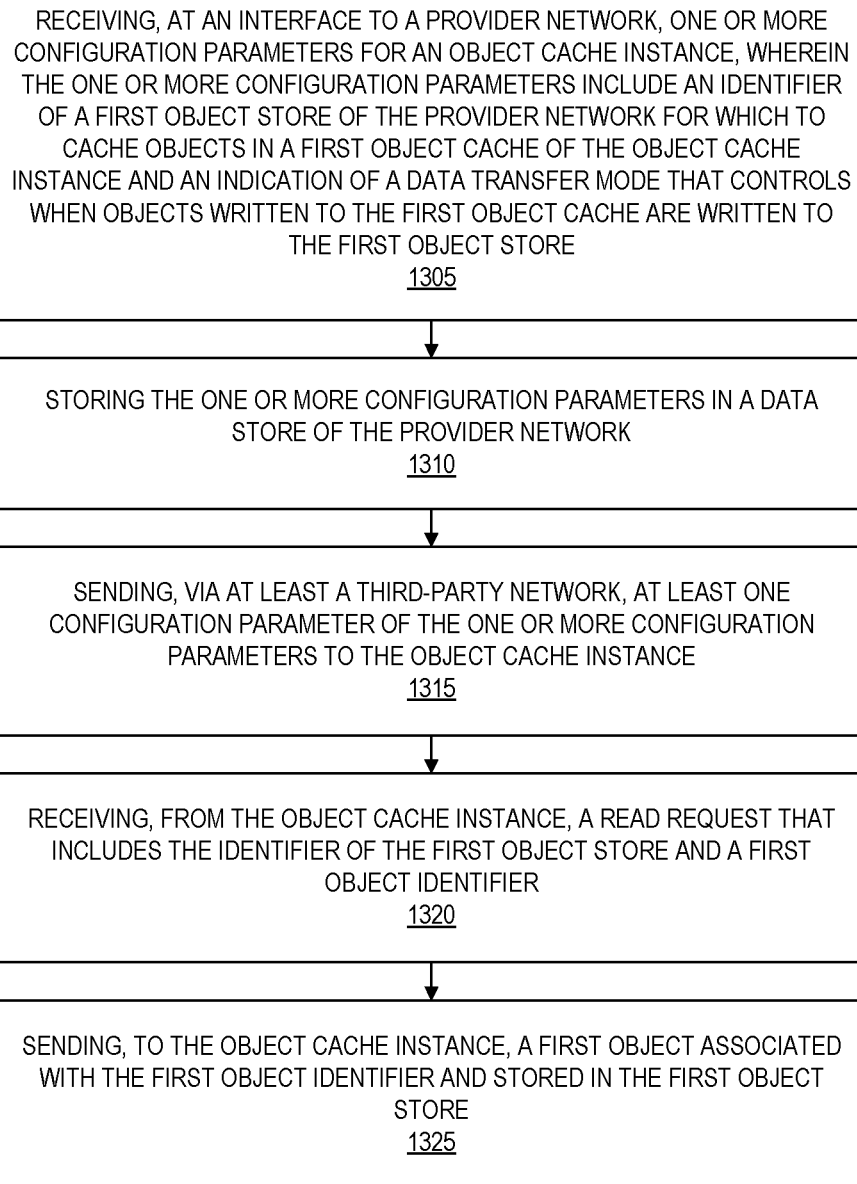
FIG. 13 is a flow diagram illustrating operations of a method for deploying an object gateway with a provider substrate extension according to at least some embodiments.

FIG. 13 is a flow diagram illustrating operations of a method for deploying an object gateway with a provider substrate extension according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of a provider network, such as services executed by computer systems located within a data center of the provider network. The provider network may be a cloud provider network. The one or more components of the provider network communicate with an extension of the provider network. The extension of the provider network includes one or more physical computing devices or systems and is remotely located from a data center (e.g., outside of the data center network) of the provider network, such as on the premises of a customer of the provider network. For example, in some embodiments, one or more (or all) of the operations are performed by components of the provider network (e.g., the interface(s) 915, the object gateway management service 920, and the object gateway endpoint 910) of the other figures.

The operations include, at block 1305, receiving, at an interface to a provider network, one or more configuration parameters for an object gateway instance, wherein the one or more configuration parameters include an identifier of a first object store of the provider network for which to cache objects in a first object cache of the object gateway instance and an indication of a data transfer mode that controls when objects written to the first object cache are written to the first object store. As described herein, a provider network can provide a management interface through which a customer can configure an object gateway instance that serves as an object cache for PSEs. Various interfaces, such as an API or console, can be used. The object gateway can provide an object cache for an object store of the provider network (e.g., object store C cache 840 for object store C 825), writing object data written by compute instances hosted by the PSE to the object gateway instance, serving cached objects to such compute instances, and fetching objects from the associated object store in the provider network when those objects are not cached. The object gateway instance provides various data transfer modes that govern when (and whether) data written to an object cache associated with an object store in the provider network (if any) is written to the object store in the provider network. For example, in a write-through mode, object data written by a PSE-hosted instance is synchronously written to the object cache and to the object store of the provider network, whereas in a write-back mode, object data written by a PSE-hosted instance is written to the object cache and, sometime later, written to the object store of the provider network.

The operations further include, at block 1310, storing the one or more configuration parameters in a data store of the provider network. As described herein, the provider network can include a database or other data store to track customer-specified configuration of an object gateway instance, such as the object gateway configuration data store 912.

The operations further include, at block 1315, sending, via at least a third-party network, at least one configuration parameter of the one or more configuration parameters to the object gateway instance. As described herein, various techniques exist for propagating configuration parameters from a provider network to an object gateway instance. For example, the object gateway instance can periodically query the provider network for updated configuration parameters (e.g., via the object gateway management service 920). As another example, the object gateway management service 920 can send updated configuration parameters to the object gateway instance upon modification to the configuration parameters.

The operations further include, at block 1320, receiving, from the object gateway instance, a read request that includes the identifier of the first object store and a first object identifier and, at block 1325, sending, to the object gateway instance, a first object associated with the first object identifier and stored in the first object store. As described herein, the object gateway instance serves as a cache for objects. In some events, a request from a PSE-hosted instance to the object gateway instance may result in a cache "miss" where the object gateway instance fetches the object on behalf of the PSE-hosted instance from the associated object store in the provider network.

Figure 14:
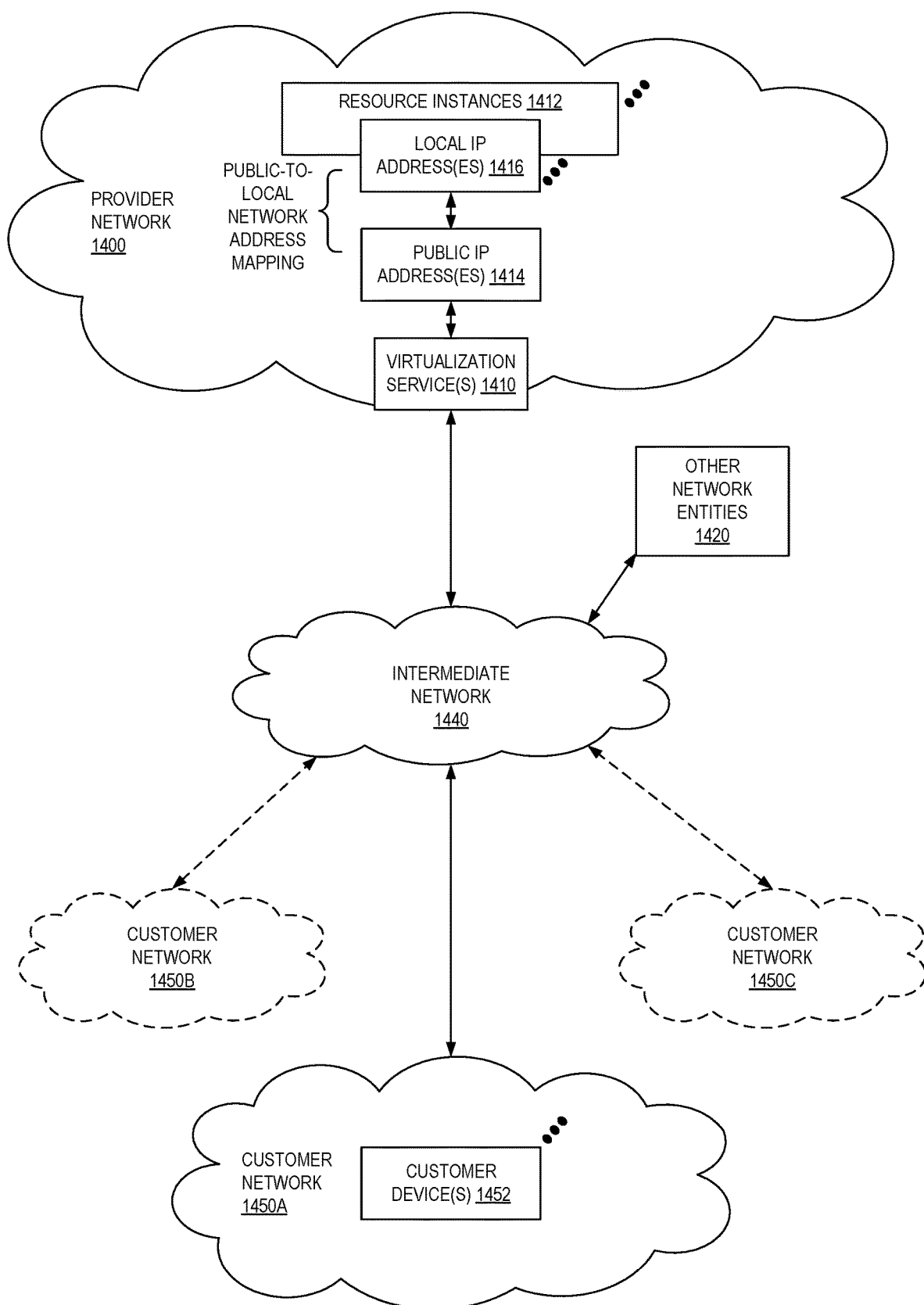
FIG. 14 illustrates an example provider network environment according to at least some embodiments.

FIG. 14 illustrates an example provider network (or "service provider system") environment according to at least some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
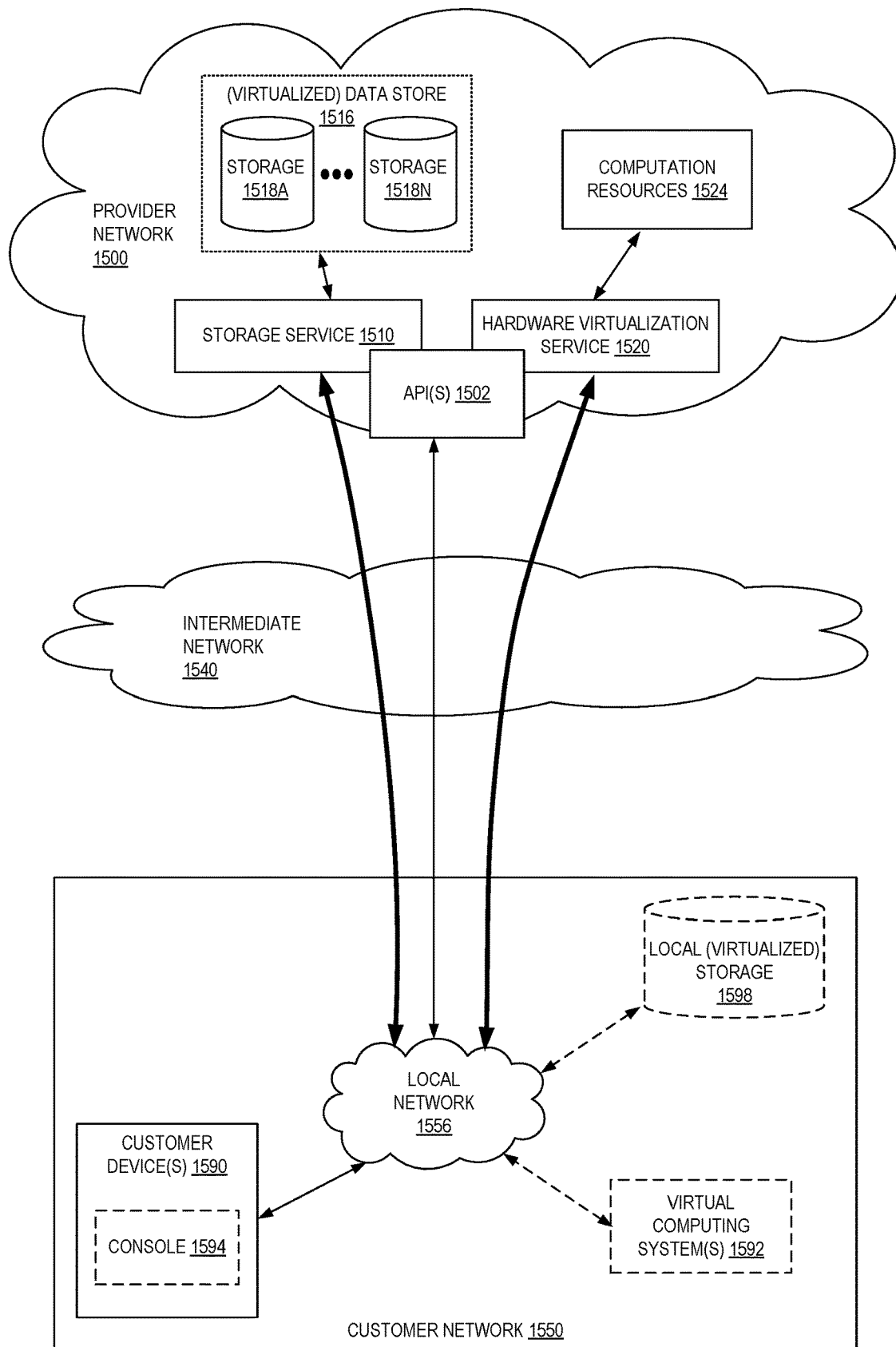
FIG. 15 is a block diagram of an example provider network that provides a storage service and a hardware virtualization service to customers according to at least some embodiments.

FIG. 15 is a block diagram of an example provider network that provides a storage service and a hardware virtualization service to customers according to at least some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some embodiments, a virtualized data store gateway (not shown) may be provided at the customer network 1550 that may locally cache at least some data, for example frequently-accessed or critical data, and that may communicate with storage service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Figure 16:
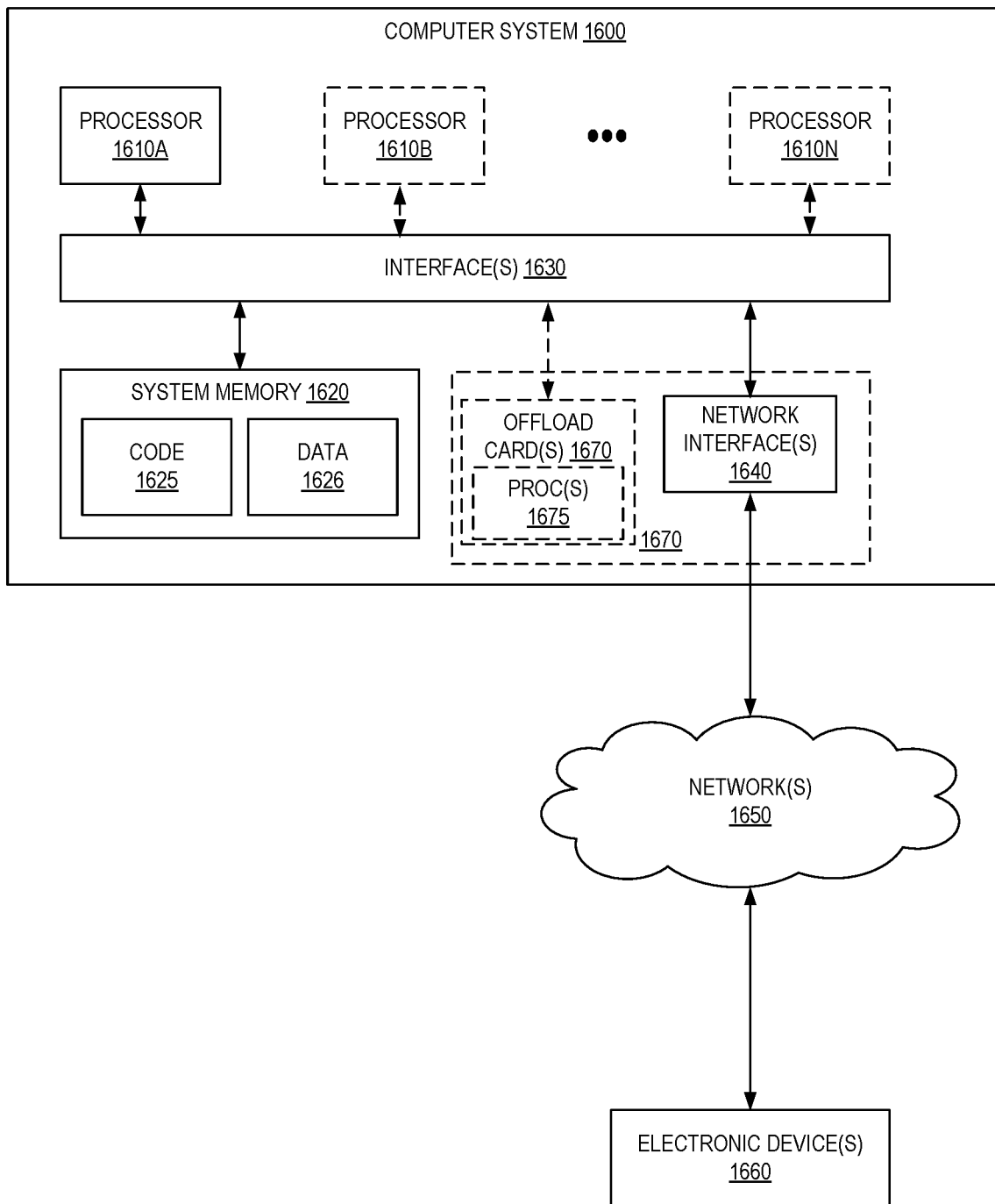
FIG. 16 is a block diagram illustrating an example computer system that may be used in at least some embodiments.

FIG. 16 is a block diagram illustrating an example computer system that may be used in at least some embodiments. In at least some embodiments, such a computer system can be used as a server that implements one or more of the control-plane and/or data-plane components that are used to support the provider substrate and/or PSE described herein, various virtualized components (e.g., virtual machines, containers, etc.), and/or SED. Such a computer system can include a general- or special-purpose computer system that includes or is configured to access one or more computer-accessible media. In at least some embodiments, such a computer system can also be used to implement components outside of the provider substrate and/or provider substrate extension (e.g., the customer gateway/router 186, other customer resources 187, and the like). In the illustrated embodiment of a computer system, the computer system computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as code 1625 and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing, or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor. With reference to FIG. 2, in at least some embodiments the PSE framework 202 and at least a portion of the functionality of the host manager 222 execute on the one or more processors 1675 of the offload cards 1670 while the instances (e.g., 232, 234, 236) execute on the one or more processors 1610.

In some embodiments, system memory 1620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 101A, 102A, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at an interface to a provider network, a request to launch an object gateway instance for an extension of the provider network, wherein the extension of the provider network is in communication with the provider network via at least a third-party network;
    causing a launch of an object gateway instance on a host of the extension of the provider network;
    receiving one or more customer-specified configuration parameters for the object gateway instance, wherein the one or more customer-specified configuration parameters include an identifier of a first object store of the provider network for which to cache objects in a first object cache of the object gateway instance and an indication of a data transfer mode that controls when objects written to the first object cache are written to the first object store of the provider network, wherein the data transfer mode is at least one of a write-through mode in which object data written to the first object cache is synchronously sent to the provider network for writing to the first object store and a write-back mode in which object data written to the first object cache is asynchronously sent to the provider network for writing to the first object store;
    sending at least one customer-specified configuration parameter of the one or more customer-specified configuration parameters to the object gateway instance;
    receiving a first request from the object gateway instance, the first request that includes the identifier of the first object store of the provider network and a first object identifier; and
    sending a first object associated with the first object identifier from the first object store of the provider network to the object gateway instance.

2. The computer-implemented method of claim 1, further comprising:
    receiving, from the object gateway instance, a write request that includes the identifier of the first object store of the provider network and a second object; and
    storing the second object in the first object store of the provider network.

3. A computer-implemented method comprising:
    receiving, at an interface to a provider network, one or more configuration parameters for an object gateway instance, wherein the one or more configuration parameters include an identifier of a first object store of the provider network for which to cache objects in a first object cache of the object gateway instance and an indication of a data transfer mode that controls when objects written to the first object cache are written to the first object store, wherein the data transfer mode is at least one of a write-through mode in which object data written to the first object cache is synchronously sent to the provider network for writing to the first object store and a write-back mode in which object data written to the first object cache is asynchronously sent to the provider network for writing to the first object store;
    storing the one or more configuration parameters in a data store of the provider network;
    sending, via at least a third-party network, at least one configuration parameter of the one or more configuration parameters to the object gateway instance;
    receiving, from the object gateway instance, a read request that includes the identifier of the first object store and a first object identifier; and
    sending, to the object gateway instance, a first object associated with the first object identifier and stored in the first object store.

4. The computer-implemented method of claim 3:
    wherein the read request further includes a credential associated with a first compute instance that requested the first object;
    wherein the first compute instance is hosted by an extension of the provider network that is in communication with the provider network via one or more secure tunnels through at least the third-party network; and
    the method further comprising verifying the first compute instance is permitted to access the first object store based on the credential.

5. The computer-implemented method of claim 4, wherein the object gateway instance is hosted by the extension of the provider network.

6. The computer-implemented method of claim 4, wherein the object gateway instance is hosted by a customer-managed server in communication with the extension of the provider network via at least the third-party network.

7. The computer-implemented method of claim 3, wherein the one or more configuration parameters include an amount of storage capacity to allocate to the first object cache.

8. The computer-implemented method of claim 3, further comprising:
    receiving, from the object gateway instance, a write request that includes the identifier of the first object store and a second object; and
    storing the second object in the first object store.

9. The computer-implemented method of claim 3, wherein the one or more configuration parameters include a performance parameter of the object gateway instance.

10. The computer-implemented method of claim 3, wherein the one or more configuration parameters are sent to the object gateway instance in response to a request from the object gateway instance.

11. A system comprising:
    a first object store implemented by a first one or more electronic devices of a provider network; and
    an object gateway management service implemented by a second one or more electronic devices of the provider network, the object gateway management service including instructions that upon execution cause the object gateway management service to:
        receive one or more configuration parameters for an object gateway instance, wherein the one or more configuration parameters include an identifier of the first object store for which to cache objects in a first object cache of the object gateway instance and an indication of a data transfer mode that controls when objects written to the first object cache are written to the first object store, wherein the data transfer mode is at least one of a write-through mode in which object data written to the first object cache is synchronously sent to the provider network for writing to the first object store and a write-back mode in which object data written to the first object cache is asynchronously sent to the provider network for writing to the first object store;
        store the one or more configuration parameters in a data store hosted by the provider network;
        send, via at least a third-party network, at least one configuration parameter of the one or more configuration parameters to the object gateway instance;
        receive, from the object gateway instance, a read request that includes the identifier of the first object store and a first object identifier; and
        send, to the object gateway instance, a first object associated with the first object identifier and stored in the first object store.

12. The system of claim 11, wherein the read request further includes a credential associated with a first compute instance that requested the first object;
    wherein the first compute instance is hosted by an extension of the provider network that is in communication with the provider network via one or more secure tunnels through at least the third-party network; and
    wherein the object gateway management service includes further instructions that upon execution cause the object gateway management service to verify the first compute instance is permitted to access the first object store based on the credential.

13. The system of claim 12, wherein the object gateway instance is hosted by the extension of the provider network.

14. The system of claim 12, wherein the object gateway instance is hosted by a customer-managed server in communication with the extension of the provider network via at least the third-party network.

15. The system of claim 11, wherein the one or more configuration parameters include an amount of storage capacity to allocate to the first object cache.

16. The system of claim 11, wherein the object gateway management service includes further instructions that upon execution cause the object gateway management service to:
    receive, from the object gateway instance, a write request that includes the identifier of the first object store and a second object; and
    store the second object in the first object store of the provider network.

17. The system of claim 11, wherein the one or more configuration parameters include a performance parameter of object gateway instance.

\* \* \* \* \*